（12）United States Patent
Kordel et al.

(10) Patent No.: US 10,633,078 B2
(45) Date of Patent: Apr. 28, 2020

(54) PRE-DEFORMED AIRCRAFT SPOILERS AND DROOP PANELS DESIGNED TO SEAL WITH FLAP IN DEFLECTED STATE

(71) Applicant: The Boeing Company, Chicago, IL (US)

(72) Inventors: Jan A. Kordel, Redmond, WA (US); Emily Georgia Rayner, Bentleigh (AU); Calvin Kao, Santa Clarita, CA (US); Adam Charles Jones, Port Melbourne (AU)

(73) Assignee: The Boeing Company, Chicago, IL (US)

( * ) Notice: Subject to any disclaimer, the term of this patent is extended or adjusted under 35 U.S.C. 154(b) by 259 days.

(21) Appl. No.: 15/835,016

(22) Filed: Dec. 7, 2017

(65) Prior Publication Data
US 2019/0176962 A1  Jun. 13, 2019

(51) Int. Cl.
*B64C 9/20* (2006.01)
*B64C 9/32* (2006.01)

(52) U.S. Cl.
CPC ............. *B64C 9/20* (2013.01); *B64C 9/323* (2013.01)

(58) Field of Classification Search
CPC .... B64C 3/48; B64C 3/52; B64C 9/02; B64C 9/10; B64C 9/20; B64C 9/32; B64C 9/323; B64C 2009/143
See application file for complete search history.

(56) References Cited

U.S. PATENT DOCUMENTS

| 2,772,058 | A | * | 11/1956 | Grant | ...................... | B64C 21/02 |
| | | | | | | 244/216 |
| 4,120,470 | A | * | 10/1978 | Whitener | .................. | B64C 9/20 |
| | | | | | | 244/213 |

(Continued)

FOREIGN PATENT DOCUMENTS

| EP | 2266877 A2 | 12/2010 |
| EP | 2509857 | 10/2012 |

(Continued)

OTHER PUBLICATIONS

Kordel, Jan A. et al., "Wing Flap Deflection Control Removal", U.S. Appl. No. 15/386,211, filed Dec. 21, 2016, 35 pgs.
(Continued)

*Primary Examiner* — Joseph W Sanderson
(74) *Attorney, Agent, or Firm* — Kwan & Olynick LLP

(57) ABSTRACT

This disclosure is directed to a methodology for designing spoilers or droop panels and aerodynamic systems including the designed spoilers or the designed droop panels. The spoilers and the droop panels can be deployed on a wing with a flap system, which provides for trailing edge variable camber (TEVC) system. During flight, the fixed portions of the wing, the flaps, the spoilers and droop panels can all deform. The spoilers or the droop panels can each be pre-deformed to a first shape on the ground such that in flight the spoilers or the droop panels deform to a second shape under aerodynamic loads. In the second shape, the spoilers or the droop panels are configured to seal better against the flaps. The spoilers or the droop panels can be configured to seal to the flaps during all of the positions the flaps take as part of the TEVC system.

24 Claims, 13 Drawing Sheets

(56) References Cited

U.S. PATENT DOCUMENTS

| | | | | |
|---|---|---|---|---|
| 4,444,368 A * | 4/1984 | Andrews | ............. | B64C 9/16 244/212 |
| 4,899,284 A * | 2/1990 | Lewis | ............. | B64C 3/48 701/3 |
| 6,109,567 A | 8/2000 | Saiz | | |
| 6,981,676 B2 * | 1/2006 | Milliere | ............. | B64C 9/04 244/213 |
| 7,611,099 B2 * | 11/2009 | Kordel | ............. | B64C 7/00 244/131 |
| 8,382,044 B2 * | 2/2013 | Holzhausen | ............. | B64C 9/22 244/213 |
| 8,556,214 B2 * | 10/2013 | McAlinden | ............. | B64C 7/00 244/130 |
| 8,651,428 B2 * | 2/2014 | Parker | ............. | B64C 9/16 244/203 |
| 8,919,703 B2 * | 12/2014 | Parker | ............. | B64C 7/00 244/130 |
| 9,038,964 B2 * | 5/2015 | Wildman | ............. | B64C 9/20 244/215 |
| 9,180,961 B2 * | 11/2015 | Morris | ............. | B64C 3/48 |
| 9,580,168 B2 * | 2/2017 | Fevergeon | ............. | B64C 9/18 |
| 9,688,384 B1 | 6/2017 | Balzer et al. | | |
| 9,776,705 B2 * | 10/2017 | Dilligan | ............. | B64C 3/48 |
| 9,840,320 B2 * | 12/2017 | Fevergeon | ............. | B64C 9/02 |
| 10,189,557 B2 * | 1/2019 | Boye | ............. | B64C 3/56 |
| 2010/0327121 A1 * | 12/2010 | McAlinden | ............. | B64C 7/00 244/215 |
| 2012/0234983 A1 * | 9/2012 | Wildman | ............. | B64C 9/20 244/215 |
| 2012/0292454 A1 * | 11/2012 | Schroeder | ............. | B64C 9/24 244/214 |
| 2013/0075536 A1 * | 3/2013 | Schroder | ............. | B64C 9/24 244/214 |
| 2016/0229519 A1 | 8/2016 | Dilligan et al. | | |
| 2017/0001712 A1 * | 1/2017 | Schlipf | ............. | B64C 9/24 |
| 2017/0174315 A1 * | 6/2017 | Neal | ............. | B64C 9/02 |
| 2018/0099736 A1 * | 4/2018 | Kordel | ............. | B33Y 10/00 |
| 2018/0170515 A1 * | 6/2018 | Kordel | ............. | B64C 9/20 |
| 2019/0263505 A1 * | 8/2019 | Blades | ............. | B64C 9/18 |

FOREIGN PATENT DOCUMENTS

| | | |
|---|---|---|
| EP | 2266877 A3 | 4/2017 |
| WO | 2011070347 A1 | 6/2011 |

OTHER PUBLICATIONS

"European Application Serial No. 18210218.6, Search Report dated Apr. 24, 2019", 9 pgs.

* cited by examiner

FIG. 3A  *Prior Art*

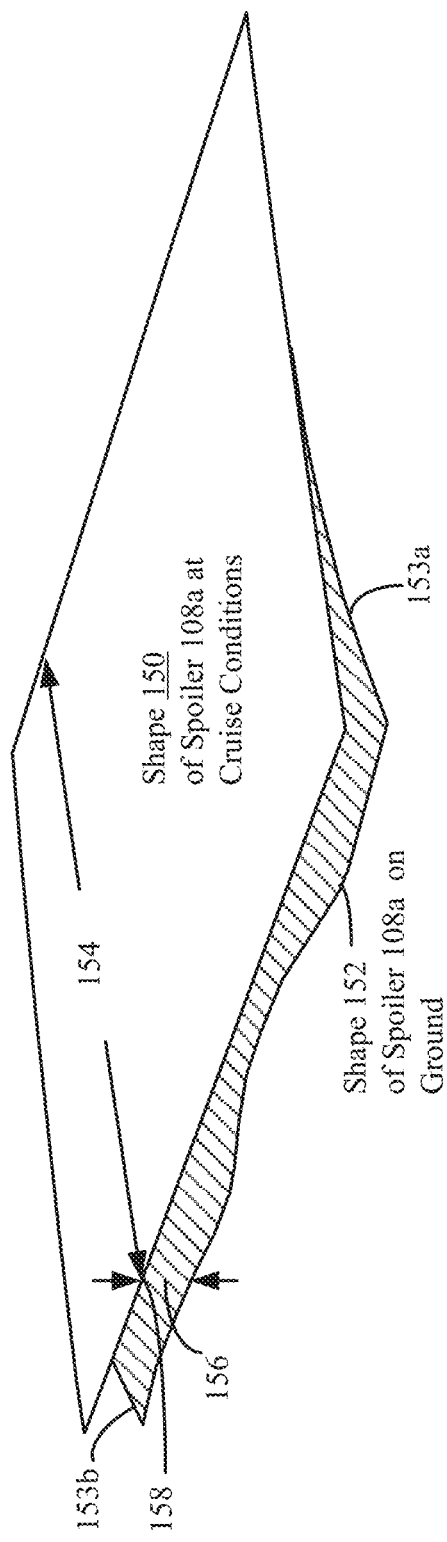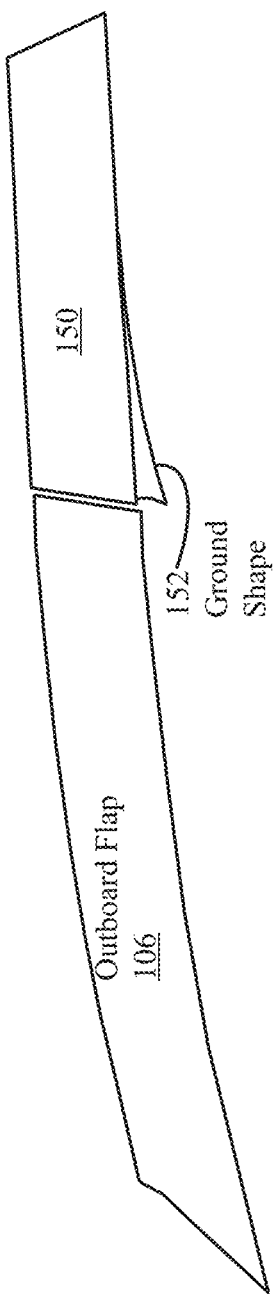
FIG. 3C
FIG. 3D

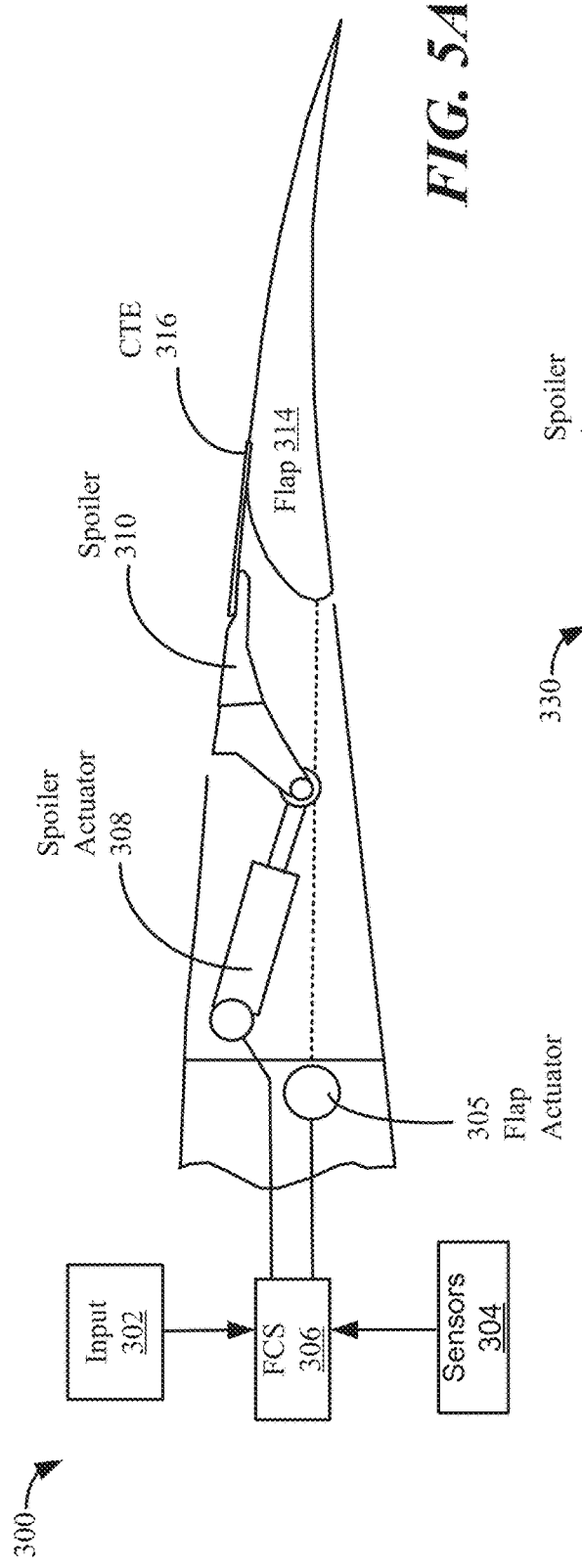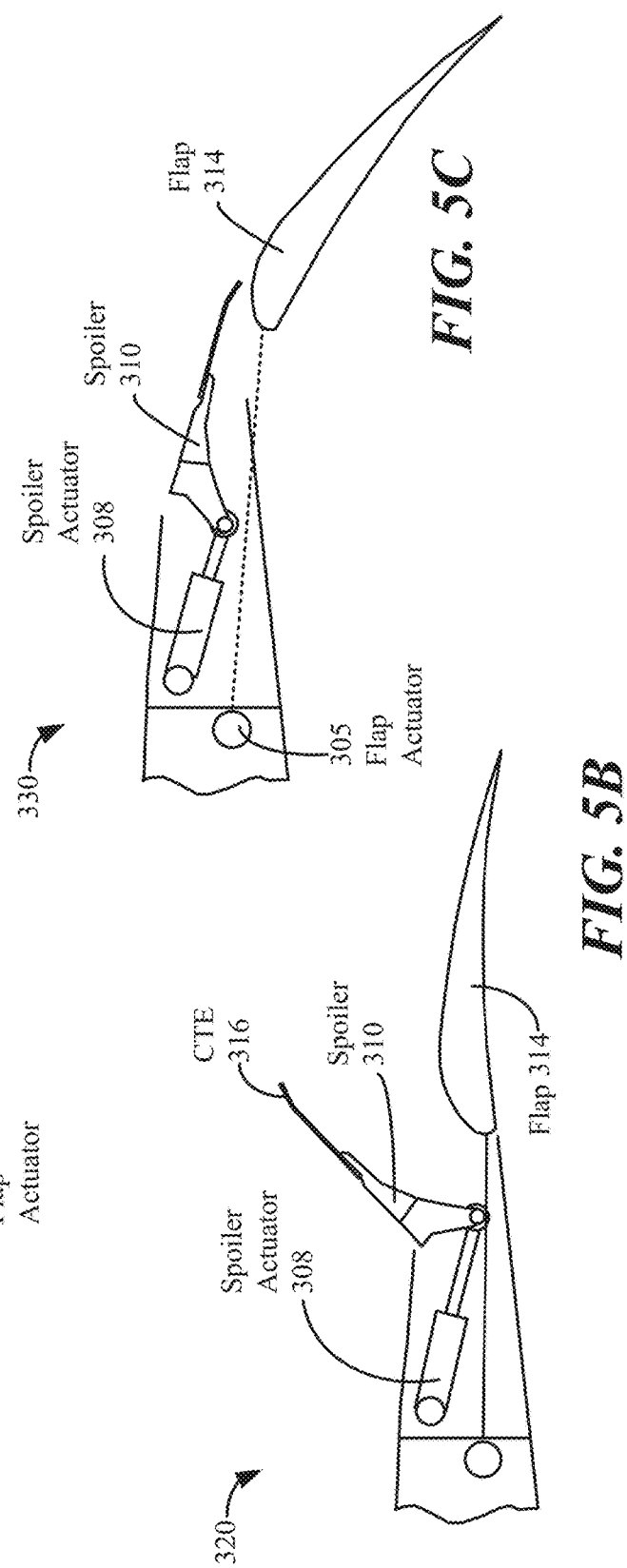

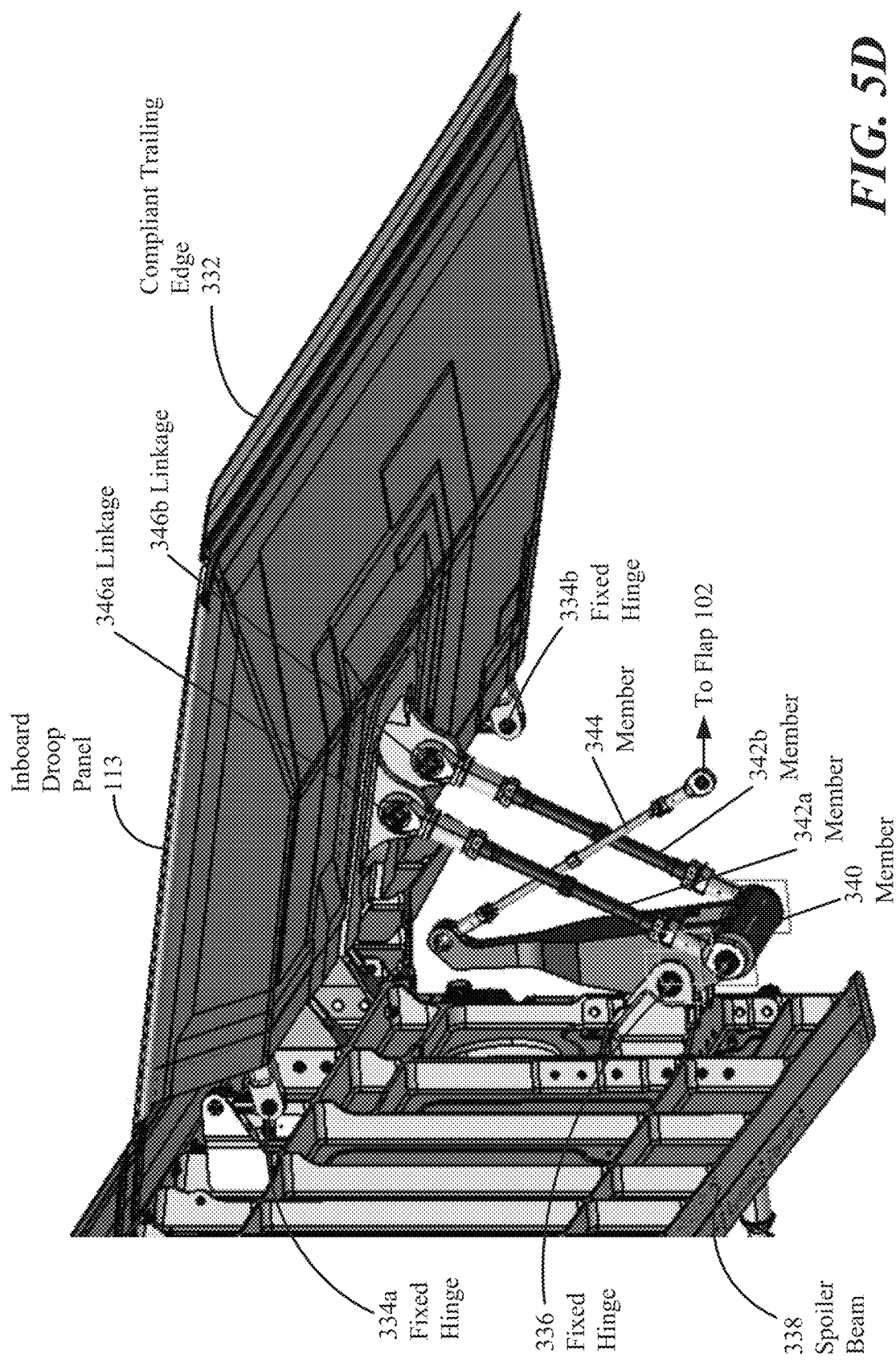

PRE-DEFORMED AIRCRAFT SPOILERS AND DROOP PANELS DESIGNED TO SEAL WITH FLAP IN DEFLECTED STATE

TECHNICAL FIELD

This disclosure generally relates to wings for airplanes. More specifically, this disclosure relates to spoilers and droop panels for a wing.

BACKGROUND

Modern aircraft, such as large passenger jets, need to operate at various speeds, including a lower speed during take-off and landing and higher speed during cruise. To accommodate operations at the various speeds, the aircraft wings include control surfaces. Typically, the control surfaces are actuatable relative to a fixed portion of the wing. By changing positions of the control surfaces relative to the fixed portion of the wing, various aerodynamic effects are achieved. The aerodynamics effects are used to control the aircraft.

One type of control surface is a spoiler. Often, spoilers are mounted adjacent to and in front of the wing flaps on a wing such that the spoilers cover a portion of the wing flaps. The spoilers can be designed to extend upwards into the air flowing over the wing in flight. When extended, a controlled stall is created over the portion of the wing behind it, which reduces the lift of that wing section and increases drag. One benefit of deploying spoilers is that the descent rate of the aircraft is increased without increasing speed.

At landing, the spoilers can be fully deployed upwards once the airplane touches down. The increase in drag adds to the braking effect. In addition, the loss of lift transfers more weight to the wheels which aids in the mechanical braking process.

During takeoff and climb as well as upon approach during landing the spoilers and droop panels can be retracted downwards towards the extended flaps to control and optimize the gap between flap and spoiler. For spoilers this is achieved by actuation. For slaved droop panels this is achieved by mechanically linking the panel to the mating flap or flaperon.

At cruise conditions, the spoilers are generally not deployed and are positioned such that the spoiler surface and flap surfaces form an aerodynamic shape with the best aerodynamic performance. However, under aerodynamic loads at cruise conditions, the wings, flaps and spoilers all deform. The mismatch in the deformations can cause geometry variations that reduce aerodynamic performance of the wing. For example, gaps can form between a spoiler and a flap or between adjacent spoilers, which allow air flow into the wing trailing edge cavity. Additionally, mismatch between spoilers or between spoilers and flaps result in excrescence drag. This undesirable airflow and mismatch reduces the aerodynamic performance of the wing. In view of the above, methods and apparatus are needed that reduce geometry variations associated with the spoilers as a result of different loading and structural conditions during flight.

SUMMARY

A methodology for designing spoilers or droop panels is described. In one embodiment, the spoilers and the droop panels can be deployed on a wing with a flap system which provides for trailing edge variable camber (TEVC) system. In a TEVC system, the flaps can be rotated around their hinge lines to modify the camber of the wing during cruise flights. The spoilers or the droop panels can be disposed forward of the flaps on the wing and can include a compliant trailing edge (CTE). The spoilers or the droop panels can be configured to seal to the flaps along the CTE during all of the positions the flaps take as part of the TEVC system.

During flight, the fixed portions of the wing, the flaps, the spoilers and droop panels can all deform. The spoilers or the droop panels can each be pre-deformed to a first shape on the ground such that in flight the spoilers or the droop panels deform to a second shape under aerodynamic loads. In the second shape, the spoilers or the droop panels are configured to seal better against the flaps. A system of spoilers and droop panels can be provided where each of the spoilers and the droop panels is pre-deformed on the ground but each has a different shape.

A geometry modification, such as downward curved edge, can be added to the CTE of the spoiler or the droop panel. The geometry modification can help increase a range of conditions over which each spoiler or the droop panel seals to an adjacent flap. In one embodiment, the geometry modification of the spoiler can be flexible enough such that when the spoiler is pressed onto the flap as a result of a rotational force applied via an actuator coupled to the spoiler and as a result of the aerodynamic loads on the spoiler, the geometry modification flattens out and a seal is formed along the CTE of the spoiler.

One aspect of the invention can be generally characterized as an aerodynamic system for an aircraft. The aerodynamic system can include 1) a fixed portion of a wing; 2) a movable flap coupled to the fixed portion of the wing and 3) a spoiler or a droop panel, coupled to the wing. The spoiler or the droop panel can have a pre-deformed shape including i) a first portion which forms a trailing edge of the spoiler or the droop panel and ii) a second portion configured to receive the first portion that attaches to the fixed portion of the wing. While not in flight, the spoiler or the droop panel in the pre-deformed shape, when brought to rest against the movable flap, makes partial contact with the movable flap and doesn't completely seal against the flap. Whereas, at one or more flight conditions, the spoiler or droop panel deforms under aerodynamic forces from the pre-deformed shape to a second shape such that in the second shape the spoiler or the droop panel more fully contacts the movable flap to reduce air flow between the spoiler or droop panel and the movable flap.

Another aspect of the invention can be generally characterized as a method of generating a spoiler or a droop panel for a wing. The method can include 1) determining a shape of a fixed portion of a wing, a movable flap and a pre-deformed shape of a spoiler or a droop panel where the spoiler or the droop panel is mechanically coupled to the wing such that it can rotate relative to the wing and where the spoiler or the droop panel includes a first portion which forms a trailing edge of the spoiler or the droop panel and a second portion configured to receive the first portion and attached to the fixed portion of the wing; 2) determining a first structure and first materials of the wing, a second structure and second materials of the flap and a third structure and third materials of the spoiler or the droop panel; and 3) specifying a flight condition where, while not in flight, the spoiler or the droop panel in the pre-deformed shape when brought to rest against the movable flap makes partial contact with the movable flap and wherein, at the flight condition, the spoiler or the droop panel deforms, under aerodynamic forces, from the pre-deformed shape to a second shape such that in the second shape the spoiler or the droop panel more fully contacts the movable flap to reduce air flow between the spoiler and the movable flap or droop panel and the movable flap.

Yet another aspect of the invention can be generally characterized as an aircraft with wings. The aircraft can include, on each wing, 1) a fixed portion of a wing; 2) a plurality of movable flaps coupled to the fixed portion of the wing and 3) a spoiler or a droop panel, coupled to the wing, having a pre-deformed shape, including a first portion which forms a trailing edge of the spoiler or the droop panel and a second portion configured to receive the first portion and attached to the fixed portion of the wing. While not in flight, the spoiler or the droop panel in the pre-deformed shape when brought to rest against a first one of the plurality of movable flaps makes partial contact with the first one of the plurality of movable flap. At one or more flight conditions, the spoiler or the droop panel deforms under aerodynamic forces from the pre-deformed shape to a second shape such that, in the second shape, the spoiler or the droop panel more fully contacts the first one of the plurality of the movable flaps to reduce air flow between the spoiler and the movable flap or the droop panel and the movable flap.

A yet further aspect of the invention can be generally characterized as an aerodynamic system for an aircraft. The aerodynamic system for an aircraft can include 1) a fixed portion of a wing; 2) a plurality of movable flaps coupled to the fixed portion of the wing; and 3) a plurality of spoilers each of the plurality of spoilers coupled to the wing, having a different pre-deformed shape while not in flight, each including the first portion which forms the trailing edge of the spoiler and the second portion configured to receive the first portion and attached to the fixed portion of the wing. Each of the different spoilers can be located at a different spanwise location on the wing and the different pre-deformed shape can be selected to account for differences in aerodynamic forces at each of the different spanwise locations that occur during one or more flight conditions. At the one or more flight conditions, each of the spoilers can deform under aerodynamic forces from the different pre-deformed shape to the second shape such that in the second shape each of the spoilers more fully contacts a first one of the plurality of the movable flaps to reduce air flow between the spoiler and the first one of the plurality of the movable flaps.

BRIEF DESCRIPTION OF THE DRAWINGS

Figure 1:
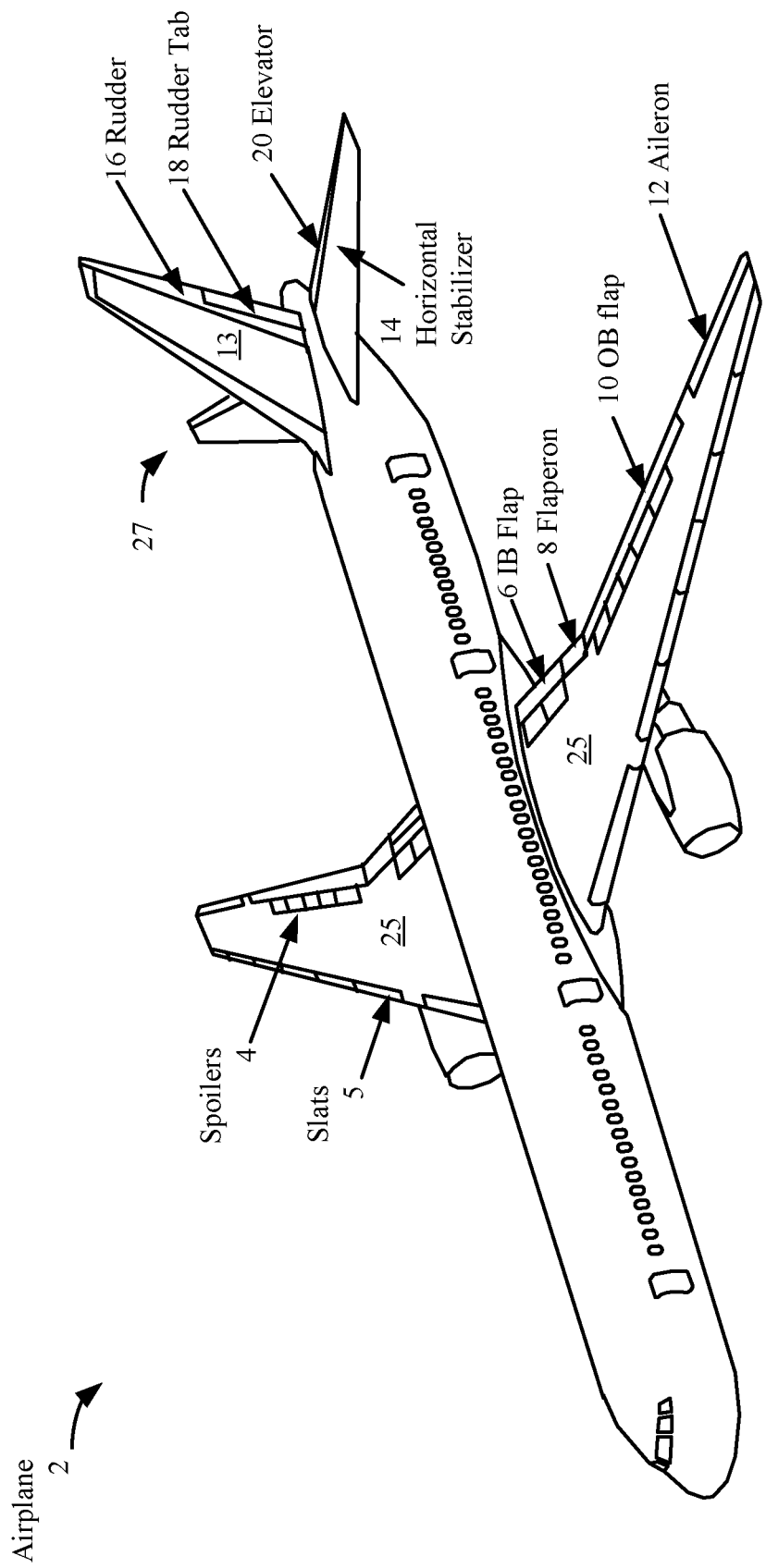

Having thus described examples of the disclosure in general terms, reference will now be made to the accompanying drawings, which are not necessarily drawn to scale, and wherein like reference characters designate the same or similar parts throughout the several views, and wherein:

FIG. 1 is a perspective view illustrating an airplane and aerodynamic high-lift device surfaces, according to one aspect of the present disclosure.

Figure 2:
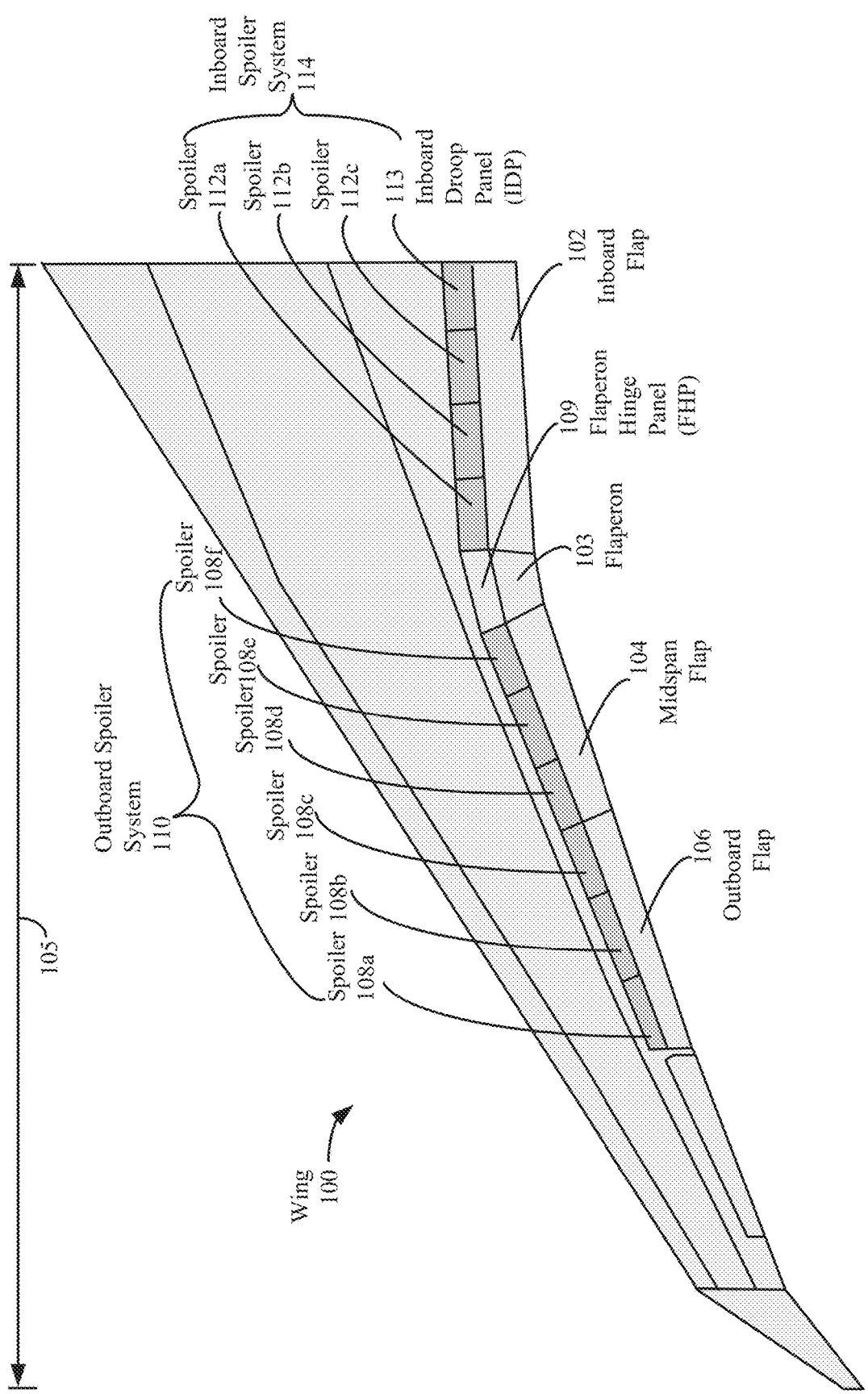

FIG. 2 is a plan view of a wing, which includes independently actuated spoilers, an inboard droop panel (IDP) mechanically linked to the inboard flap and a flaperon hinge panel (FHP) mechanically linked to the flaperon according to one aspect of the present disclosure FIGS. 3A, 3B, 3C and 3D are perspective view of spoilers and flaps on a portion of a wing including shape deformations that occur at cruise conditions under aerodynamic loads, according to aspects of the present disclosure.

Figure 4A:
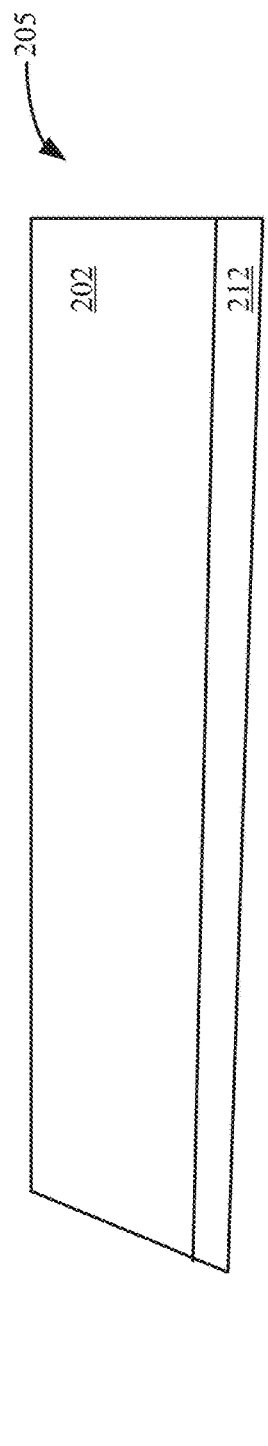

FIG. 4A is a top view of a spoiler, according to one aspect of the present disclosure.

Figure 4B:
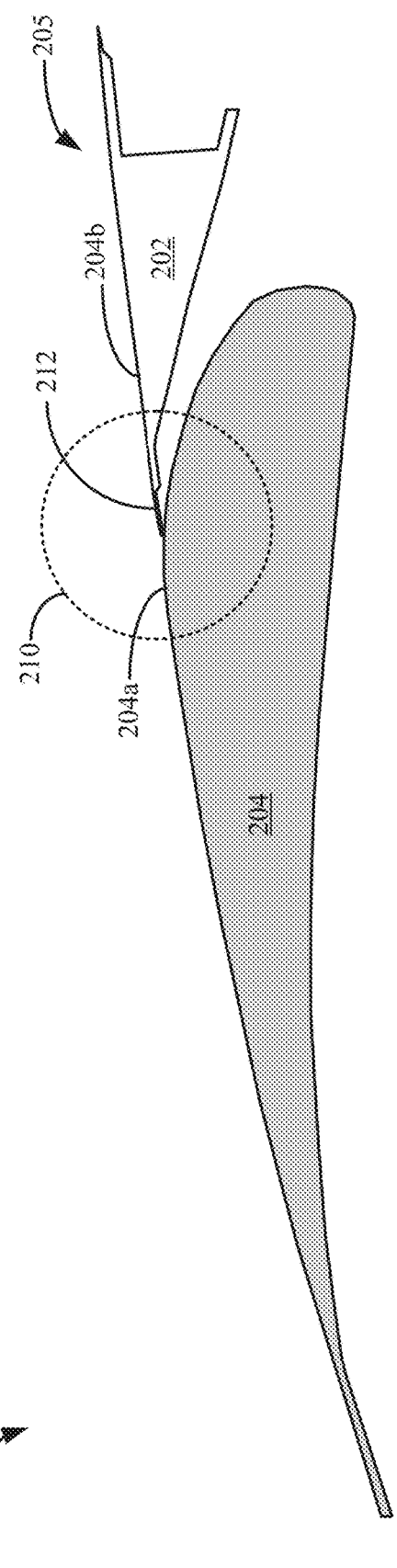
Figure 4C:
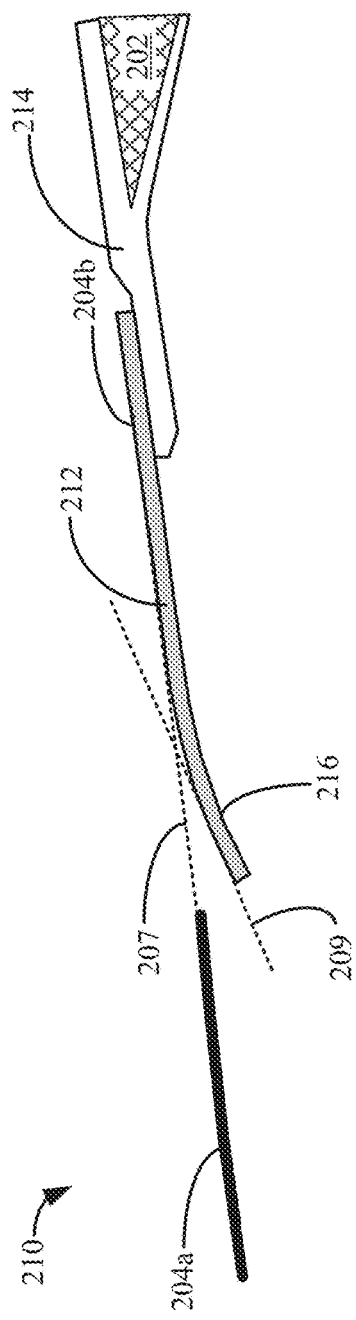

FIGS. 4B and 4C are side views of a flap and a spoiler including the flap spoiler interface, according to one aspect of the present disclosure.

FIGS. 5A, 5B and 5C are cross sections of flap and spoiler assemblies in different orientations as a result of actuator control, according to one aspect of the present disclosure.

Figure 5E:
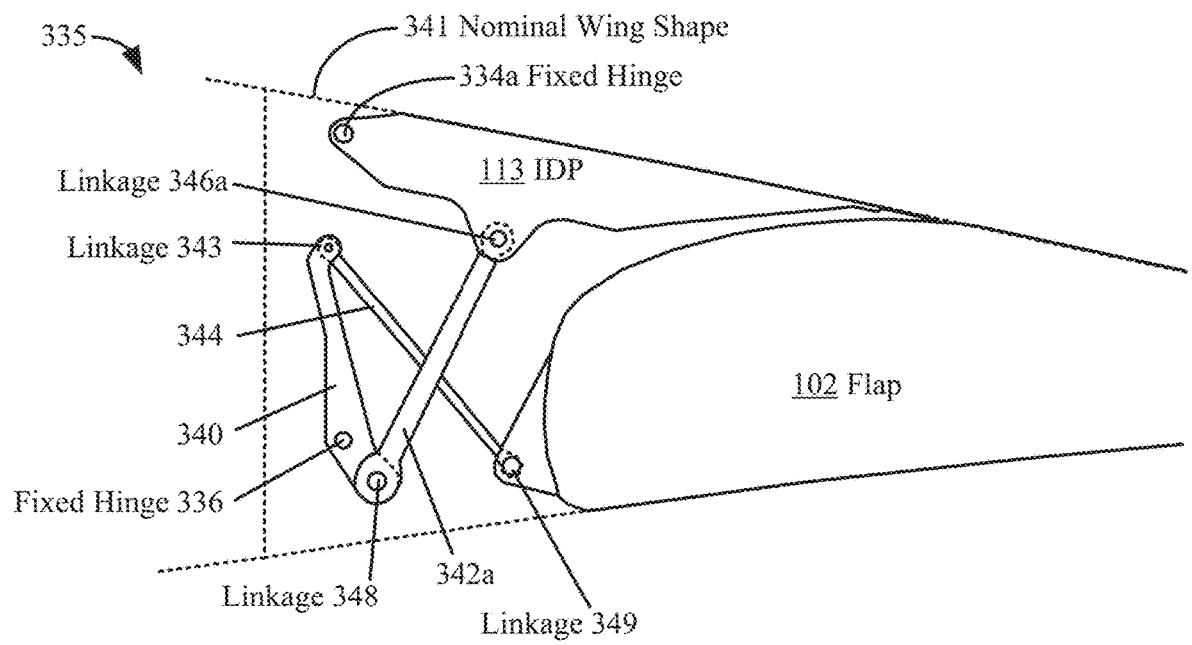
Figure 5F:
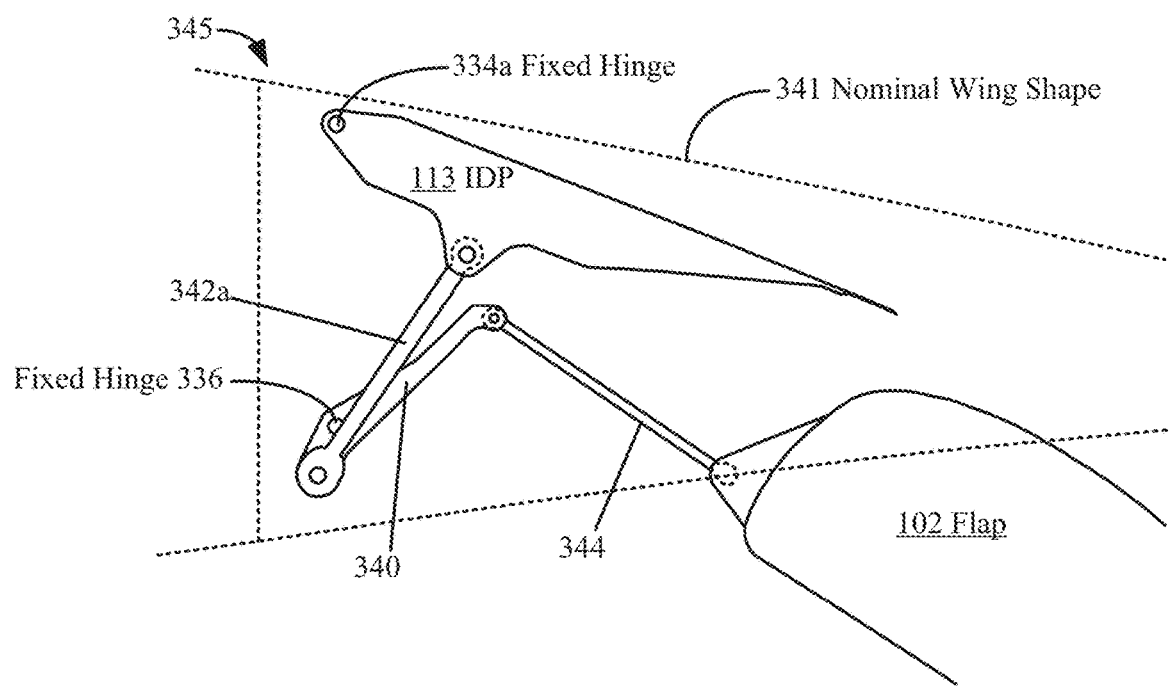

FIGS. 5D, 5E and 5F are a perspective view and cross sections of an inboard flap mechanical coupled to an inboard droop panel in different orientations as a result of actuator control, according to one aspect of the present disclosure.

Figure 6A:
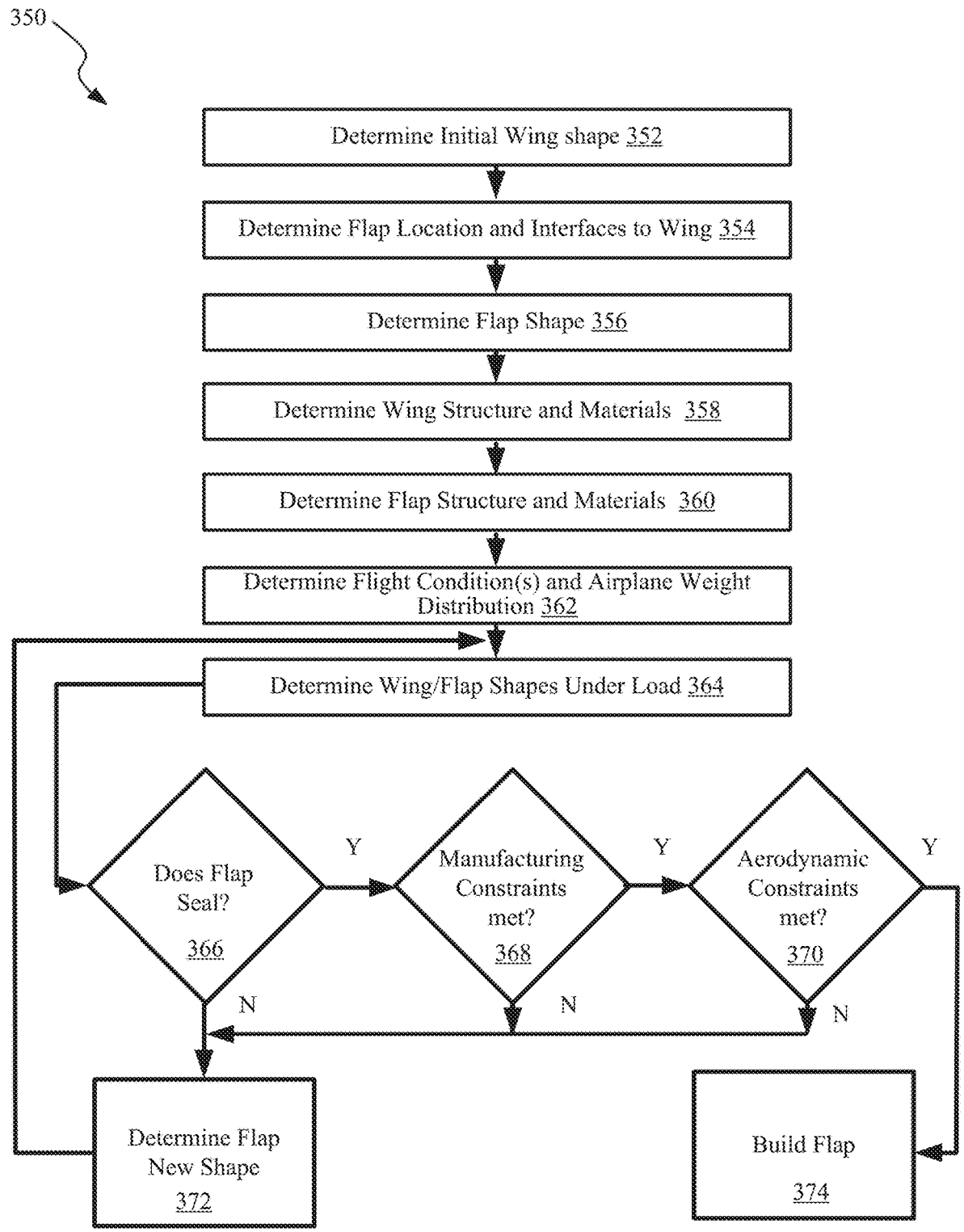

FIG. 6A is block diagram of a flap design methodology, according to one aspect of the present disclosure.

Figure 6B:
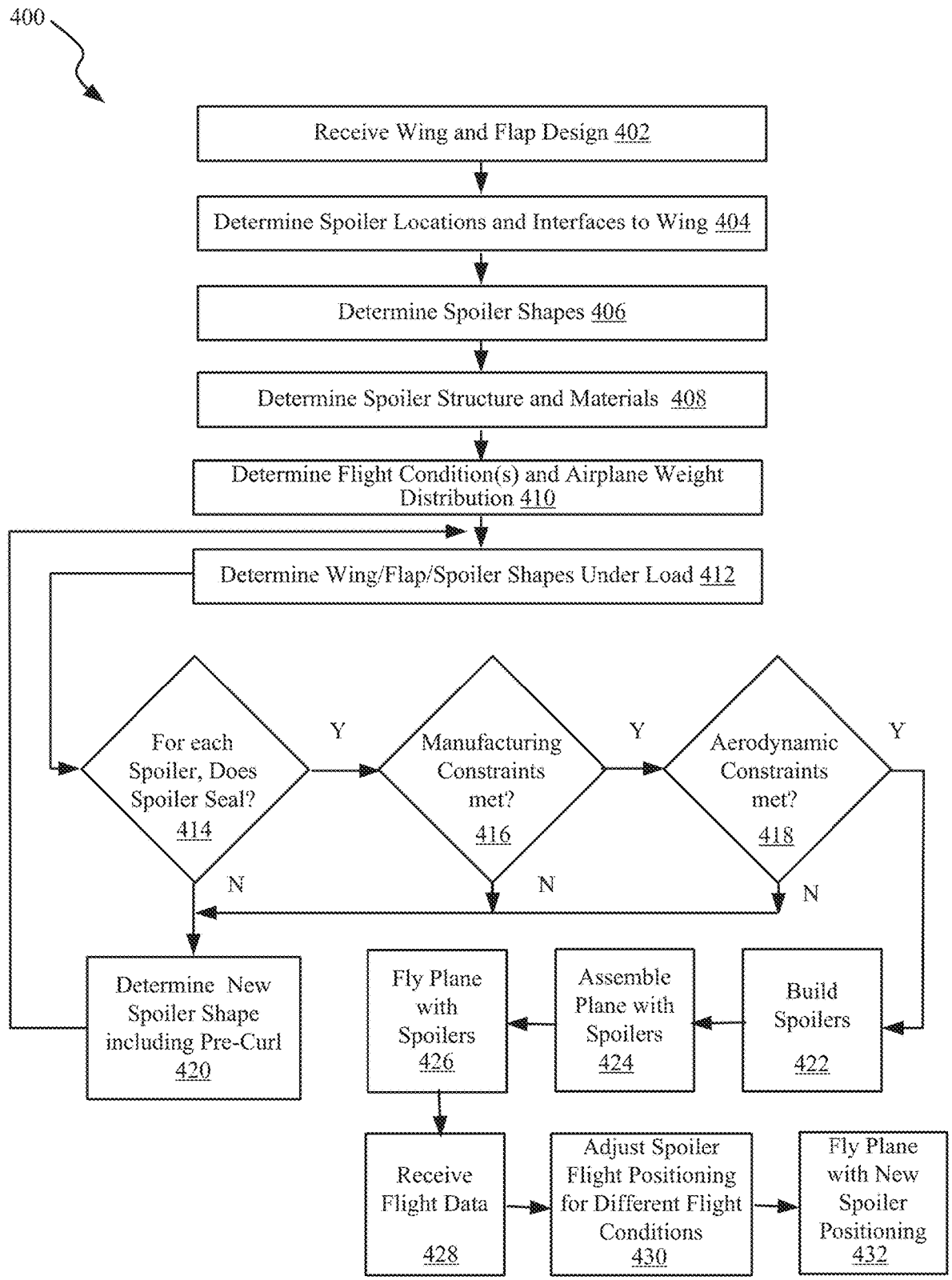

FIG. 6B is block diagram of a spoiler design methodology, according to one aspect of the present disclosure.

Figure 6C:
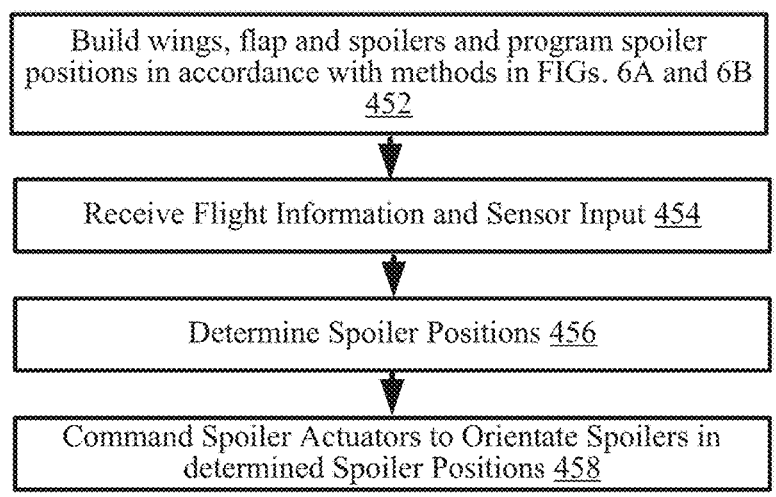

FIG. 6C is block diagram of a method of controlling an aircraft, according to one aspect of the present disclosure.

Figure 7:
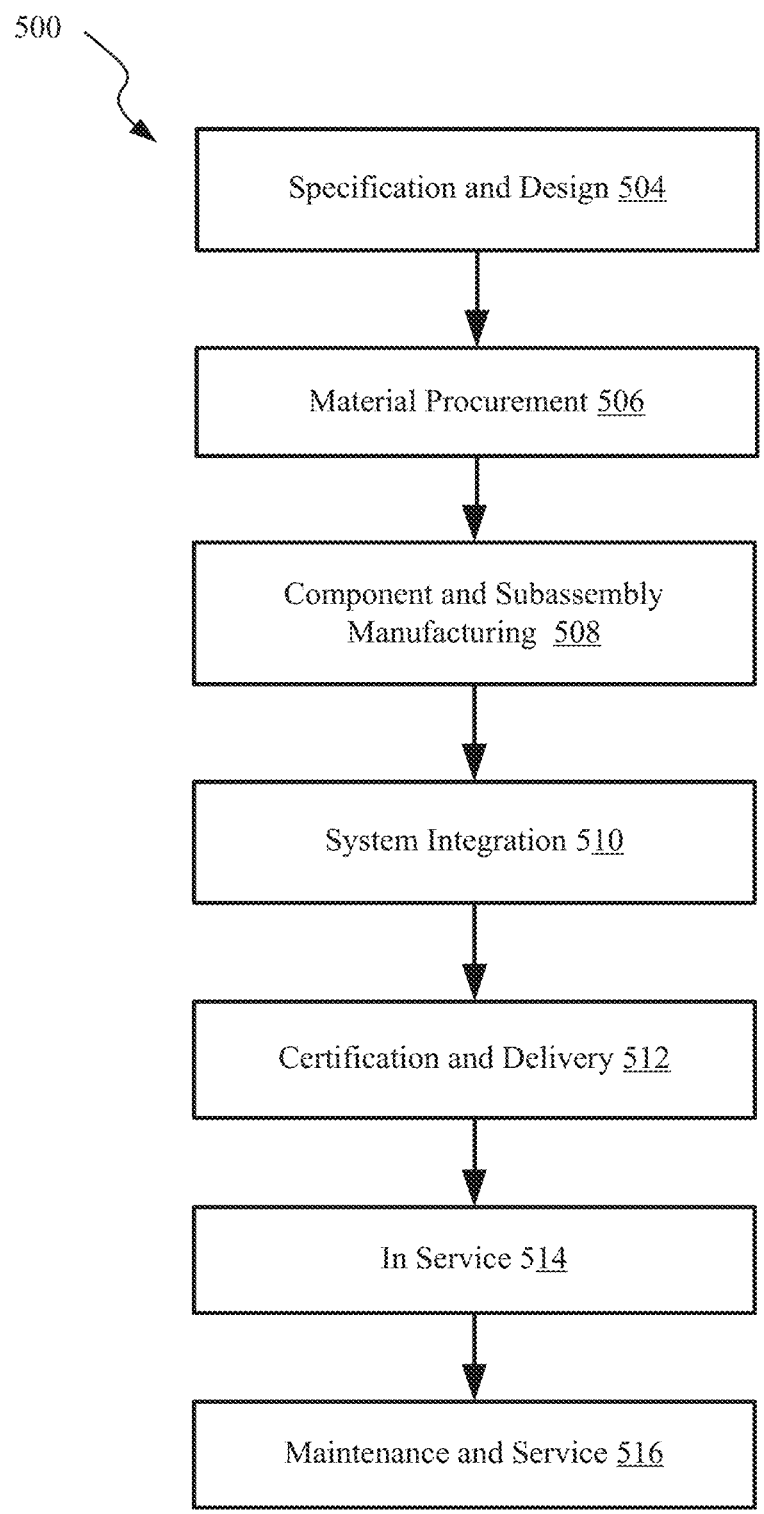
Figure 8:
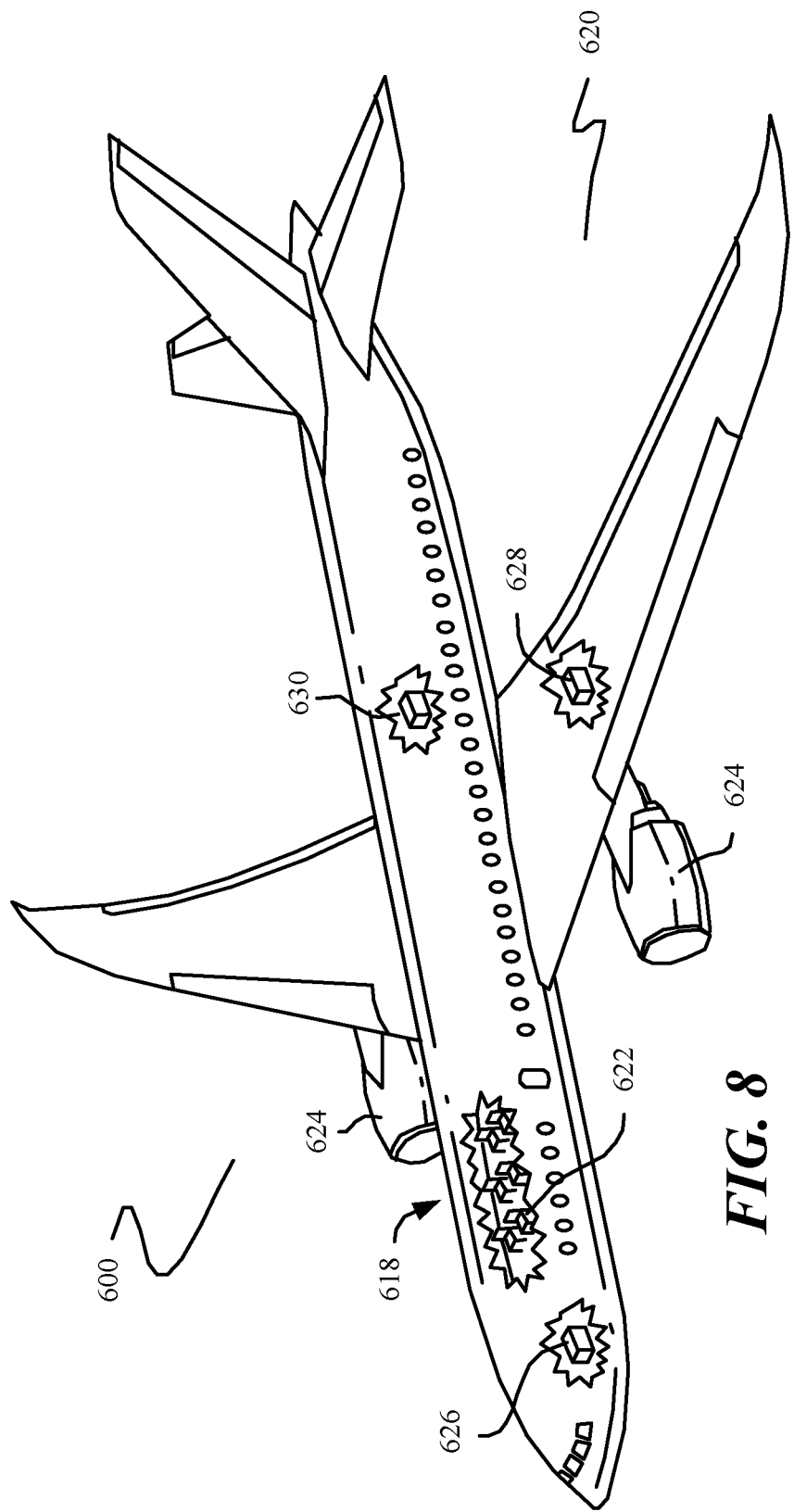

FIG. 7 is a block diagram of an aircraft production and service methodology that may utilize the flaps described with respect to FIGS. 1-6B, according to one aspect of the present disclosure FIG. 8 is a schematic illustration of an aircraft that may utilize a flap in accordance with FIGS. 1-6B, according to one aspect of the present disclosure.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Introduction

A methodology for designing spoilers is described. In one embodiment, the spoilers can be deployed on a wing with a flap system which provides for trailing edge variable camber (TEVC) system. In a TEVC system, the movable flaps can be rotated around their hinge lines to modify the camber of the wing during cruise flights. The spoilers can be disposed forward of the flaps on the wing and can include a compliant trailing edge (CTE). The spoilers can be configured to seal to the flaps along the CTE during all of the positions the flaps take as part of the TEVC system.

During flight, the fixed portions of the wing, the flaps and the spoilers can all deform. The spoilers can each be pre-deformed to a first shape on the ground such that in flight the spoilers deform to a second shape under aerodynamic loads. In the second shape, the spoilers are configured to seal better against the flaps. The better seal can include a greater contact area with the movable flap to reduce air flow between the spoiler (or a droop panel) and the movable flap. A system of spoilers can be provided where each of the spoilers is pre-deformed on the ground, but, with a different shape.

In more detail, an airplane and aerodynamic surfaces used on an aircraft are described with respect to FIG. 1. With respect to FIG. 2, a plan view of a wing including spoiler locations is discussed. With respect to FIGS. 3A, 3B, 3C and 3D, pre-deformation of spoiler shapes to account for deformations under aerodynamic loads, such as at cruise conditions are described. With respect to FIGS. 4A, 4B and 4C, a flap, a spoiler and a spoiler-flap interface are described. With respect to FIGS. 5A, 5B and 5C, a flap and spoiler assembly is discussed. With respect to FIGS. 5D, 5E and 5F, a flap and a droop panel assembly is discussed.

FIGS. 2-5C are associated with a Boeing 777x configuration. However, this example is provided for the purposes of illustration only. The articles of manufacture and the methodologies described herein can be used with many different types of modern aircraft. These aircraft can have a different number of flaps, spoilers and flap configurations and spoiler configurations. Hence, the example is not meant to be limiting.

With respect to FIGS. 6A and 6B, methods of flap and spoiler design are described. With respect to FIG. 6C, a method of using the spoilers designed in FIGS. 6A and 6C are discussed. With respect to FIG. 7, an aircraft production and service methodology that may utilize the aerodynamic systems described with respect to FIGS. 1-6C is described. Finally, with respect to FIG. 8, a schematic illustration of an aircraft that may utilize an aerodynamic system in accordance with FIGS. 1-6C is discussed.

Aircraft High-Lift Device Surfaces

FIG. 1 is a perspective view illustrating an airplane 2 and its associated aerodynamic high-lift device surfaces. On the wings 25, slats 5 are used near the leading edge of each wing. Near the trailing edge, spoilers 4, inboard (IB) flap 6, flaperon 8 and outboard (OB) flap 10, and an aileron 12 are provided on each wing. As noted above, this flap configuration is provided for the purposes of illustration only and is not meant to be limiting. The high-lift device surfaces, such as the inboard flap 6, can be configured to articulate in some manner, relative to the wings 25.

The empennage 27 is provided with a vertical stabilizer 13, rudder 16 and rudder tab 18. The horizontal stabilizer 14 is provided with an elevator 20. The rudder 16 and rudder tab 18 can be configured to move relative to the vertical stabilizer and the elevator can be configured to move relative to the horizontal stabilizer.

The configuration above is associated with an existing Boeing 777™ configuration. A Boeing 777x configuration includes a single slotted flap. The 777x configuration includes three flaps per wing whereas other configurations include only two flaps per wing. A flaperon provides high lift and roll control. On some aircraft the flaperon is an inboard (IB) aileron. On a Boeing 737, there is no flaperon/IB aileron. Instead, the flaps come together for this wing. Thus, the wing example described herein is provided for the purposes of illustration only and is not meant to be limiting.

In one embodiment, the wings can include trailing edge variable camber system. The trailing edge variable camber system can include a drooping spoiler and flap mechanisms (see outboard spoiler system 110 and inboard spoiler system 114 in FIG. 2), a mechanically drooped inboard droop panel (IDP) and a mechanically drooped flaperon hinge panel (e.g., see flaperon 103, FHP 109, inboard flap 102 and IDP 113 in FIG. 2). The trailing edge variable camber system can provide a range of aerodynamically sealable flap and spoiler positions at cruise conditions. It can slightly adjust the flap in flaps up (cruise) position to optimize fuel burn as the aircraft flies through its mission by adjusting the spanwise lift distribution.

Spoiler Design Methodology

FIG. 2 is a plan view of a wing 100. The wing configuration is associated with a 777x variant and is provided for the purpose of illustration only and is not meant to be limiting. The wing includes fixed portions and movable portions. The movable portions include an inboard flap 102, flaperon 103, a midspan flap 104, outboard flap 106, outboard spoiler system 110 which includes the OB Spoilers 108a-f and FHP 109, and inboard spoiler system 114 which includes the IB spoilers 112a-c and IDP 113. The distance 105 can be about one hundred and six feet. On different airplanes, distance 105 can be smaller or larger.

The outboard spoiler system 110 includes six spoilers, 108a, 108b, 108c, 108d, 108e and 108f and the FHP 109. Spoilers 108a, 108b and 108c are positioned forward of the outboard flap 106. Spoilers 108d, 108e and 108f are positioned forward of the midspan flap 104 and the FHP 109 is positioned forward of the flaperon 103. The inboard spoiler system 114 includes three spoilers 112a, 112b and 112c and the IDP 113 positioned forward of the inboard flap.

In this example, the spoilers can be about twenty to thirty five inches in depth chordwise and seventy five to one hundred and five inches in length spanwise. The number of spoilers above each flap and their dimensions can vary. Thus, the example of three or four spoilers above the flaps, FHP and IDP panels and their associated dimensions is provided for the purposes of illustration only.

Each of the spoilers and droop panels can be attached to the wing 100 with an attachment mechanism that allows for rotation about a hinge line. The number of attachment points between the spoiler and the wing can determine how loads, such as bending loads associated with the wing, are transferred to the spoilers. The loads can affect how the spoilers deform in flight. In one embodiment, four attachment points can be utilized between the wing and the spoiler. However, more or fewer attachment points can be used and four is provided for the purposes of illustration only.

In particular embodiments, one or more actuators can be associated with each spoiler. The one or more actuators can be configured to rotate each of the spoilers upwards or downwards to change a position of one of the spoiler relative to a fixed portion of the wing. The spoilers can be configured to be actuated relative to one another and the flaps. In some instances, as described in more detail below, the spoilers can be rotated to make a better seal or greater contact with the flap when the spoilers rest against the movable flap.

In one embodiment, one or more the spoilers can be configured to move dependently with one of the flaps. Thus, a mechanical linkage can be provided between a flap and a droop panel or flaperon and hinge panel. Via the mechanical linkage, when the flap/flaperon is actuated, the dependent panel can also move (e.g., an example mechanical linkage for a droop panel and flap is shown in FIGS. 5D, 5E and 5F). The spoiler system described herein is provided as a general description inclusive of droop panels such as IDP and FHP but is not meant to be limiting to other panels positioned forward of high lift devices such as flaps or flaperons.

The inboard flap 102 and/or the outboard flap can be part of a trailing edge variable camber (TEVC) system. In TEVC system, the flaps can be rotated about their respective hinge lines to modify the camber of the wing during cruise flight. The spoilers can be configured to seal to the flap at the aft end of the spoiler for all cruise positions of flap TEVC at the compliant trailing edge (CTE) location of the spoiler. Typically, the inboard flap 102 can be rotated up and the outboard flap 106 can be rotated down or vice versa. Through these motions, the overall twist of the wing can be changed. These motions, including the amount of rotation applied to each flap can be adjusted throughout the course of a flight to compensate and optimize the performance for the airplane as the weight changes due to consumption of fuel.

A flight control system can be programmed to position the spoilers to match the flaps at each specific flap TEVC position. In one embodiment, a look up table can be provided for this purpose. Besides a current flap TEVC position, the spoiler position can also be adjusted to compensate for altitude and airplane speed. Flight test data indicates that these variables affect external air pressures enough that spoiler commanded positioning can be useful to ensure spoiler CTE to flap sealing for all these cases. This spoiler positioning can be an airplane level requirement.

For each spoiler, the one or more actuators can be programmed to rotate the spoiler to a given position. There are many variables which the flight computer can integrate to determine this position. Again, the determination can be based on a database called the "lookup table" for which the flight control system is responsible. Generally, there are up positions the spoilers go to "spoil" aerodynamic lift of the wing, add drag and or roll the airplane. Further, there are cruise positions the spoilers go to ensure sealing between flap and spoiler CTE throughout the full range of TEVC positions (about 20 different discreet TEVC flap angles ranging from about 1.5 deg trailing edge up and 0.7 deg trailing edge down) and there are down positions the spoilers go to achieve a desired gap between spoiler and flap for seven different high lift variants for landing and takeoff performance. A flight control system and a few spoiler positions are shown in FIGS. 5A, 5B and 5C.

Next, some of the effects of shape deformation under aerodynamic loads during flight are described. FIGS. 3A, 3B, 3C and 3D are perspective view of spoilers and flaps on a wing segment 120 of a wing 100 shown in FIG. 2. The wing segment 120 includes a fixed portion of the wing, the outboard flap 106, the midspan flap 104 and the spoilers in the outboard spoiler system 110 (see FIG. 2).

To determine some effects of shape deformation, an initial shape can be proscribed to the wing, flap and spoiler system, such as a desired aerodynamic shape of the wing. Then, the structure of each component, including materials and attachment points, can be modeled. Then, aerodynamic loads can be simulated and applied to the simulated structure, such as at cruise conditions, to determine shape deformations.

In a first example, the wing, flaps and spoilers are given shapes such that they all fit smoothly together on the ground. Then, aerodynamic loads at cruise conditions are applied to the wings, flaps and spoilers. The results are shown in FIGS. 3A and 3B for a wing segment 120 of the wing 100 shown in FIG. 2.

Figure 3B:
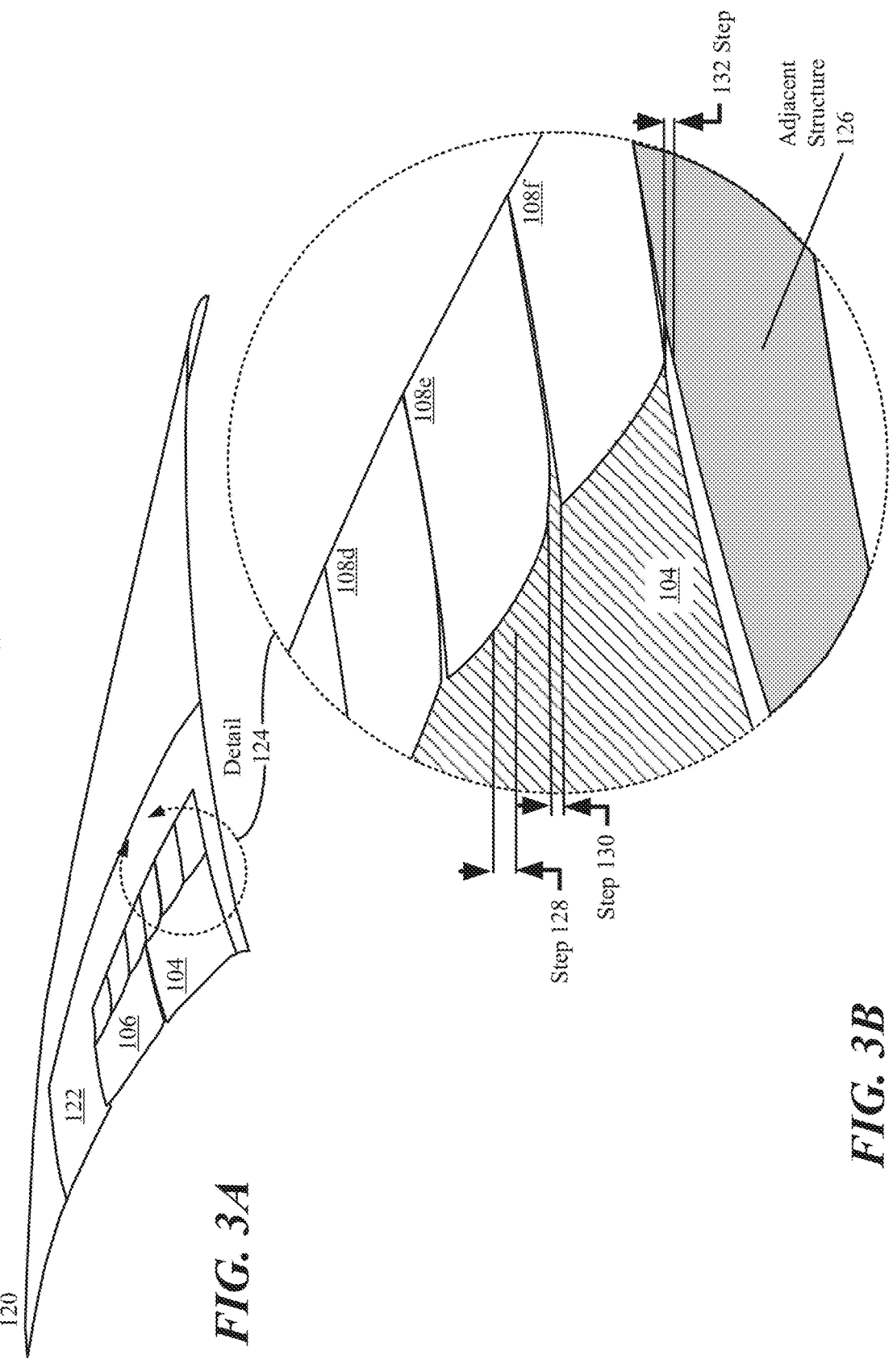

In FIG. 3A, in response to aerodynamic loads at cruise conditions, the midspan flap 104 and the outboard flap 106 are deformed. For example, outboard flap 106 is twisted upwards relative to fixed structure 122. In FIG. 3B, detail 124 shows deformations associated with midspan flap 104 and spoilers 108d, 108e and 108f. In the spanwise direction, spoiler 108e is curved upwards at the corners to form an arc. Chordwise, the spoiler 108e is curved upwards at the trailing edge and curved away from the midspan flap 104.

The upward curvature at the trailing edge of spoiler 108e causes a step gap 128 between the spoiler 108e and the midspan flap 104. The size of this gap varies in the span wise direction. The aerodynamic forces vary from spoiler to spoiler. Thus, spoiler 108e curves more than spoiler 108f. As a result, a step gap 130 is formed between spoiler 108e and 108f. Finally, because midspan flap 104 also deforms, a step 132 is formed between the midspan flap 104 and the adjacent structure 126. It is also an undesirable step between 108f and adjacent structure 126. In additional embodiments, deflections in the IDP mechanical linkage (see FIGS. 5D, 5E and 5F) can create significant gaps between the IDP and flap. As a result, droop panels (such as IDP and FHP) can have an additional challenge that doesn't exist for actuated spoilers.

At cruise conditions, these deformations can degrade the aerodynamic performance of the wing. For example, step 132 can allow air to bleed from the upper surface of the wing to a bottom surface decreasing lift. As another example, the spoilers sticking up into the flow can increase drag.

One method for dealing with the deformations is to pre-deform the flaps and the spoilers with a first shape, so that under cruise conditions, the flaps and spoilers deform to a desired aerodynamic shape. For example, on the ground, the midspan flap 104 and the outboard flap 106, and spoilers in FIGS. 3A and 3B can initially have a smooth aerodynamic shape. Under loads, the flaps and spoilers deform to shapes shown in FIGS. 3A and 3B. To obtain smooth aerodynamic shapes under loads, the flaps and spoilers can be given an inverse of the shapes shown in FIGS. 3A and 3B.

Thus, the following process is suggested. First, aerodynamic shapes for the wing, flaps and spoilers are specified not accounting for aerodynamic loads. Next, loads are applied to the first aerodynamic shapes to determine deformed shapes under loads. Next, the inverse shape of the deformed shapes is determined. Then, the wing, flaps and spoilers are given the inverse shape as second aerodynamic shapes on the ground without loads. Then, the loads are applied to the second aerodynamic shapes to determine whether the wings, flaps and spoilers smoothly fit together while loaded. If the wings, flaps and spoilers don't smoothly fit together under loads, adjustments can be made to the second aerodynamic shapes to obtain third aerodynamic shapes and then loads reapplied to the third aerodynamic shapes. This process can be repeated as needed.

As an example, midspan flap 104 and the outboard flap 106 can be pre-deformed with an inverse of the shapes shown in FIGS. 3A and 3B. The result can be the inverse deforms to a smoother aerodynamic shape in flight and the step gaps shown in FIGS. 3A and 3B can be significantly reduced. Additional details of this approach are described with respect to FIGS. 6A and 6B.

FIGS. 3C and 3D illustrate an example of a flap and spoiler pre-deformed on the ground so that a desired shape is obtained at cruise conditions. In FIG. 3C, the shape of spoiler 108a (see FIG. 2) on the ground and at cruise conditions is shown. Shape 152 is the pre-deformed shape on the ground. When the pre-deformed shape 152 of the spoiler rests against a movable flap, gaps can exist between the spoiler and the flap because of the curved shape of the spoiler. In one embodiment, the pre-deformed shape 152 can be bowed. At cruise conditions, shape 150 is much flatter because the spoiler deforms under aerodynamic forces. For example, the pre-deformed shape 152 can be bowed and then can straighten under the aerodynamic forces.

The shape 150 can allow for an improved seal between the spoiler and the flap. Thus, the spoiler or the droop panel in the pre-deformed shape 152 when brought to rest against the movable flap can make partial contact with the movable flap. At one or more flight conditions, the spoiler or the droop panel can deform under aerodynamic forces from the pre-deformed shape to a second shape (e.g., shape 150) such that in the second shape the spoiler or the droop panel has greater contact area with the movable flap or more fully contacts the movable flap to reduce air flow between the spoiler and the movable flap or the droop panel and the movable flap. The different pre-deformed shapes of the spoilers or droop panels can be selected to account for differences in aerodynamic forces at each of the different spanwise locations that occur during one or more flight conditions.

In one embodiment, the amount of deformation from the shape 150 at cruise to the pre-deformed ground shape 152 can be between zero to five percent of the chordwise length 155 of shape 150. For example, at the edge 158, with chordwise length 155, the pre-deformed ground shape 152 is shifted down by an amount 156 which is between zero to five percent of the chordwise length 155 (Also, the amount of shift can zero and the surfaces can align at some locations). The amount of downward shift and hence the percentage of the chordwise length varies over the surface of the pre-deformed ground shape 152. Although not shown, the pre-deformed ground shape 152 can also be shifted above the surface of shape 150 in some locations.

FIG. 3D shows the spoiler 108a with shape 150 at cruise conditions resting against the outboard flap 106. The shape 150 of the spoiler 108a, which is smoother, can provide a better seal to the outboard flap 106 then a flap that was not pre-deformed. The pre-deformed ground shape 152 is also shown. In this example, the pre-deformed ground shape 152 extends beneath a top surface of the outboard flap 106. In operation on the ground, the spoiler 108a can be rotated about its hinge line to keep it from impinging the outboard flap 106.

As described above, the pre-deformations applied to each spoiler can vary from spoiler to spoiler at different spanwise locations along the wing. The different pre-deformed shapes can be selected to account for differences in aerodynamic forces at each of the different spanwise locations that occur during one or more flight conditions. Further, the position of the spoiler (or droop panel) can also have a different chordwise position on the wing at each spanwise location. The chordwise position on the wing can affect the aerodynamic forces at a particular location and hence amount of pre-deformation which is applied to the spoiler at the particular location. Thus, the pre-deformed ground shape 152 is provided for the purposes of illustration only and is not meant to be limiting.

In various embodiments, a spoiler or droop panel can be deformed only in the chordwise direction, such as via downward curves 153a and 153b in FIG. 3C. Thus, curves 153a and 153b can be the same. Further, between curves 153a and 153b, the intermediate curves can be constant.

In other embodiments, the downward curvature can vary in the spanwise direction. For example, in FIG. 3C, curves 153a and 153b can be different, such as more downward curvature for curve 153a versus curve 153b. In the spanwise direction, the intermediate curves can linearly vary between the two curves, 153a and 153b. In another embodiment, curves 153a and 153b can be similarly shaped. However, as shown in FIG. 3C, in the intermediate curves in the spanwise direction, the amount of downward curvature can be greater than or less than the downward curvature of curves 153a and 153b.

In general, curve 153a can have a first downward curvature, curve 153b can have a second downward curvature and the downward curvature of the intermediate curves in the spanwise direction can be greater than or less than the downward curvature of either one or both curves 153a or 153b in the spanwise direction. As an example, in FIG. 3C, the amount of downward curvature of the intermediate curves in the spanwise direction decreases and then increases between curves 153a and 153b. As described above, other variations in the spanwise direction are possible and FIG. 3C is provided for the purposes of illustration only.

With respect to FIGS. 4A, 4B and 4C, a spoiler and its interface to a flap are described. FIG. 4A is a top view of the spoiler 205. In FIG. 4A, the spoiler 205 includes a first portion 212 having a compliant trailing edge (CTE) and a second portion 202 configured to receive the first portion with the CTE.

In one embodiment, the second portion 202 of the spoiler 205 can be formed from a metal, such as aluminum or a carbon composite, such as a carbon bond assembly. In another embodiment, the first portion 212 having the CTE can be formed from a carbon composite, such as carbon solid laminate or fiberglass solid laminate. Typically, the first portion can be more flexible than the second portion configured to receive the first portion.

FIG. 4B shows a system 200 including a side view of a flap 204 and a spoiler 205. In this example, a slope 204a on the flap 204 is aligned with a slope 204b on the spoiler 205. In one embodiment, the first portion 212 can have a constant slope which matches slope 204a. Hence, the first portion can be substantially tangent to the flap 204 at the contact point.

In another embodiment, the first portion can be angled or curved downwards such that the CTE of the first portion 212 extends geometrically below the surface of flap 204 when slopes 204a and 204b are aligned. Mechanically, as the top surface of flap 204 is solid, when slopes 204a and 204b are aligned, the first portion 212 can't extend into the flap 204. Instead, the first portion 212 can be pushed upwards from the contact with the surface of the flap. As a result, the first portion 212 can tend to flatten out and straighten. This downward angled or curved feature can help increase the seal between the spoiler and flap.

In another embodiment, the spoiler 205 can be rotated upwards about its hingeline such that the first portion 212 rests lightly against the flap 204. Under aerodynamic loads, the first portion 212 can deform and flatten out. In various embodiments, an on-ground shape of the first portion 212 can be proscribed. Then, the on-ground shape of the first portion 212 can be deformed in response to a force applied via an actuator, via aerodynamic forces or combinations thereof. In the case of an actuator, for a fixed position of the spoiler 205, the flap 204 can be rotated into the first portion 212 to cause the first portion 212 to deform. Further, for a fixed position of the flap, spoiler 205 can be rotated into the flap 204 to cause the first portion 212 to deform. In addition, the spoiler 205 and the flap 204 can each be rotated into each other to cause the first portion to deform.

FIG. 4C shows detail 210 in FIG. 4B. A line 207 is aligned with slope 204a on flap 204 and slope 204b on the first portion 212. The second portion includes a first section 214 configured to receive the first portion 212. The first portion 212 can be attached to second portion in the first section 214.

The first portion 212 includes the CTE 216 which extends below line 207. In one embodiment, the first portion 212 including CTE 216 can be curved with a slope that varies from the slope of line 207 to the slope of line 209 in a plurality of increments. In one instance, the CTE 216 can be continuously curved. In another embodiment, the CTE 216 can be angled such that a change from the slope of line 207 to the slope of line 209 occurs at a single location in a discontinuous manner.

The amount that the CTE extends below line 207 can vary from location to location along the CTE in the spanwise direction in the pre-deformed state as shown in FIG. 3C. In addition, the amount that the CTE 216 extends below line 207 and geometrically below the surface of flap 204 can vary from spoiler to spoiler. Although not typical, CTE 216 can be curved upwards so that it extends above line 207.

Next, a configuration of a spoiler and flap with actuators are described. FIGS. 5A, 5B and 5C are cross sections of flap and spoiler assemblies in different orientations as a result of actuator control. In FIG. 5A, a side view of an aerodynamic system 300 including a flap 314, a spoiler 310 having a compliant trailing edge 316, a flap 314, a spoiler actuator 308 and a flap actuator 305. The spoiler actuator 308 can be configured to adjust a position of the spoiler 310 and the flap actuator 305 can be configured to control a position of the flap 314. Thus, the spoiler actuator 308 can control a rotational position of the spoiler 310.

The flight control system (FCS) 306 can be configured to receive inputs, such as pilot inputs 302 and sensor inputs 304. Sensor inputs can include flight information, such as a current altitude, a current velocity, a current position of the flap 314 and a current position of the spoiler 310. In response to the pilot inputs and/or the sensor inputs 304, the flight control system 306 can be configured to control a position of the spoiler 310.

In one embodiment, as described above, the flight control system 306 can be configured to adjust a position of the spoiler 310 to better seal against the flap 314 during a flight condition. For example, at a flight condition, the spoiler actuator 308 can be commanded to rotate the spoiler 310 so that it presses the compliant trailing edge 316 into the flap 314. When the compliant trailing edge 316 is pressed into the flap 314, a better seal can be created between the flap 314 and the spoiler 310. The flight control system 306 can be configured to control each of the spoilers with actuators in this manner.

In FIG. 5A, the orientation of the flap 314 and spoiler 310 can be representative of a cruise condition. As described above, as part of a TEVC, the flight control system 306 can adjust the flap 314 position slightly upwards and downwards during various cruise conditions using the flap actuator 305. As the flap 314 position is adjusted, the flight control system 306 can also be configured to adjust the position of spoiler 310 to improve sealing between the flap 314 and the spoiler 310 using the spoiler actuator 308. These adjustments can be determined as a function of velocity and altitude. In addition, data received from flight testing can also be used to determine positions of the spoiler.

In FIG. 5B, an orientation 320 of the flap 314 and spoiler is shown where the spoiler 310 is angled upward to spoil flow over the flap 314. The spoiler 310 is angled upward in response to actuation of the spoiler actuator 308 which is controlled by the flight control system 306. This position can typically occur during landing. The CTE 316 of the spoiler is angled downward in this position and is close to its on the ground shape.

In FIG. 5C, the orientation 330 of flap 314 is angled downward. The flap 314 can be angled downward in response to a command sent from the flight control system 306 to the flap actuator 305. The spoiler 310 is also angled downward in response to a command sent from the flight control system 306 to the spoiler actuator 308. The spoiler 310 can be angled downward to improve the aerodynamic flow from the fixed portion of the wing, over the spoiler and onto the flap 314. The angle of the spoiler 310 can be selected so that the flow is not "spoiled," i.e., flow separation doesn't occur.

In FIG. 5C, the flap 314 can also be translated, such as translated rearwards. For example, the flap 314 can translate rearwards away from the spoiler and rotated downwards. The spoiler 310 can elongate as it deforms under aerodynamic loads to better seal with a flap that has shifted/translated rearwards.

Next, a flap and droop panel configuration is described with respect to FIGS. 5D, 5E and 5F. As described above with respect to FIG. 2, two examples of a flap and a droop panel configuration are 1) the flaperon 103 and flaperon hinge panel (FHP) 109 and 2) the inboard flap 102 and the inboard droop panel (IDP) 113. With respect to FIGS. 5D, 5E and 5F, an embodiment of the inboard flap 102 and IDP 113 is described for the purposes of illustration.

FIG. 5D is a perspective drawing including the IDP 113. The IDP 113 includes a compliant trailing edge (CTE) 332 which can seal against a flap in flight, such as inboard flap 102. The IDP 113 can be coupled to the spoiler beam 338, which is a component of the fixed portion of the wing, via fixed hinges, 334a and 334b.

A mechanical linkage can mechanically couple the IDP 113 to the inboard flap 102 such that a movement of the inboard flap 102 causes a movement of the IDP 113. The mechanical linkage includes members 340, 342a, 342b and 344. Member 340 is attached to the spoiler beam via fixed hinge 336.

Members 342a and 342b are coupled to member 340 on one end and to the IDP 113 on the other end. Members 342a and 342b are coupled to the IDP 113 via linkages 346a and 346b. Member 344 is attached to member 340 on one end and to the inboard flap 102 on the other end via a linkage (see FIG. 5E).

In operation, when the inboard flap 102 moves away from the spoiler beam 338, a force is applied through member 344 which causes member 340 to rotate in a clockwise direction about fixed hinge 336. The clockwise rotation transmits forces through members 342a and 342b which pulls the IDP 113 downward. The downward pull causes the IDP 113 to rotate clockwise about the fixed hinges, 334a and 334b, and move downwards.

When the inboard flap 102 moves towards the spoiler beam 338, a force is applied through member 344 which causes member 340 to rotate in a counter-clockwise direction about fixed hinge 336. The counter clockwise rotation transmits forces through members 342a and 342b which pushes the IDP 113 upward. The upward push causes the IDP 113 to rotate counter-clockwise about the fixed hinges, 334a and 334b, and move upwards.

Next, with respect to FIGS. 5E and 5F, the mechanical linkage between the IDP 113 and the inboard flap 102 and its operation are further described. FIG. 5E shows a side view of the IDP 113 and the inboard flap 102 at a cruise condition orientation 335. The dashed line shows a nominal wing shape 341 at the cruise condition orientation 335.

In FIG. 5E, member 342a is attached to the IDP 113, via linkage 346a, on one end and attached to member 340, via linkage 348, on the other end. Linkage 348 allows the member 342a and member 340 to rotate relative to one another. Member 344 is attached to the inboard flap 102, via linkage 349, on one end, and attached to member 340 on the other end, via linkage 343. Linkage 349 allows the inboard flap 102 to rotate relative to member 344. Linkage 343 allows member 344 to rotate relative to member 340.

In FIG. 5F, shows a side view of the IDP 113 and the inboard flap 102 at a condition 370 where the flap is deployed downward from the nominal wing shape 341. As described above with respect to FIG. 5C, an actuator coupled to the flap can cause the flap to move downward. The downward motion of the inboard flap 102, via the mechanical linkage including members 340, 342a, 342b and

344, pulls the IDP 113 downward and causes a clockwise rotation of the IDP 113 about the fixed hinge 334a.

FIG. 6A is block diagram of a flap design method 350, according to one aspect of the present disclosure. In 352, an initial wing shape is determined. The initial wing shape can be based upon initial design specifications for an airplane, performance requirements and aerodynamic simulations. In some instances, the three dimensional initial wing shape may be initially specified as a continuous component without any of the high-lift device surfaces modeled or the high-lift device surfaces only partially specified. The aerodynamic simulations used to design the initial wing shape may cover a range flight conditions from take-off and landing to cruise conditions.

In 354, a flap size and location on the initial wing can be specified. If the initial wing shape is continuous and doesn't include high-lift device surfaces, a section of the initial wing can be removed to accommodate the flap. Further, attachment interfaces and their locations can be specified. The attachment interfaces includes the hardware that allow the flap to be attached to the wing and move relative to the wing.

Also, a range of motion of the flap can be specified. The range of motion can affect the design of the attachment interfaces, such as the distance of the axis about which the flap rotates from the bottom of the flap and a fairing on the wing that is needed to accommodate the flap assembly. When the flap is used in a trailing edge variable camber (TEVC) system, the range of motion can also include flap positions associated with this system. As described above, the as-built flap shape can be designed to make sure flap seals properly in the different positions associated with a TEVC system.

In 356, an initial flap shape can be selected. For example, the initial flap shape can be selected to generally follow the shape of the wing where the flap was removed. The trailing edge of the fixed portion of the wing adjacent to the leading edge of the flap can be a relatively flat vertical surface. However, the leading edge of the flap, as described above, can be rounded. The leading edge of the flap can be shaped to improve the aerodynamic performance of the flap when deployed down for high lift performance.

In 358, the wing structure and materials can be specified. The wing structure can include a specification of such components as the skin, ribs, spars and stringers and their associated locations. Materials, such as Aluminum (metals in general) or composites, can be used to construct the wing. The wing structure affects how much the wing will twist and bend under the applied aerodynamic loads. The specified wing structure and materials can be used in a finite element analysis to determine the deformation of the flap under the aerodynamic loads.

In 360, the flap structure and materials can be specified in a similar manner as to the wing. The internal structure of the flap is different from the wing because of such factors as it is designed to move, it doesn't carry fuel, it experiences different loads than the wing and it attaches to the wings at discrete locations. Thus, the stiffness of the flap can be different than the wing. Hence, its aeroelastic response is different than the wing. The specified flap structure and materials can be used in a finite element analysis to determine the deformation of the flap under the aerodynamic loads.

In 362, one or more flight conditions and airplane weight distributions can be specified. These conditions affect the aeroelastic response of the wing and the flap. In particular, the magnitude of the aeroelastic response can vary from condition to condition. Simulations and experimental testing can be done at a number of different conditions to determine whether the aeroelastic of the flap is satisfactory within a desired operational envelope.

As an example, the typical cruise speed for a Boeing 777 is about Mach 0.84 (554 MPH) at a cruise altitude of 35,000 ft. The operating empty weight, depending on the model, can vary between 300,000 to 400,000 pounds. The maximum takeoff weight, depending on the model, can vary between 545,000 and 775,000 pounds. The maximum landing weight, depending on the model, can be between 445,000 and 557,000 pounds. Thus, for any particular airplane model, a fuel and cargo load at particular flight conditions can be specified as part of a testing envelope for a wing and flap.

In 364, the wing and flap shapes at the specified flight conditions can be determined. For example, the specified flight conditions can be cruise with the plane loaded to some weight greater than its empty weight. A numerical simulation of the aerodynamic loads on the wing and flaps can be determined and then an amount of deformation of the wing and flap can be determined. As described above, the amount of deformation depends on such factors as the aerodynamic loads, the weight of the plane, the structure of the wing and flap and the initial unloaded three dimensional shape of the wing and the flap.

In some embodiments, this process can be repeated a number of times as the aerodynamic loads can change as the wing and flap deform. For example, based on the aerodynamic loads determined using the initial shape of the wing and flaps, a second shape of the wing and flaps can be determined. Then, using the second shape of the wing and flaps, new aerodynamic loads can be determined. Based upon the new aerodynamic loads, a deformation of the second shape to a third shape can be determined. This iterative process can be repeated until the shape of the wing and flap converge to a particular shape at a particular set of conditions. Then, in flight, the movable flap deforms under aerodynamic forces from a first pre-deformed shape to a second shape which is desirable.

This process can be repeated at each of the selected flight conditions. In this example, the initial unloaded shape is the same. However, the effects of the shape on the aerodynamics and the aerodynamics on the shape are considered in a coupled manner. Hence, the iterative nature of the process. In alternate embodiments, the effects of the shape change on the aerodynamics may not be considered.

In 366, a check can be performed to determine whether the shape of the flap at the simulated conditions makes contact with the seal. If the flap doesn't seal, in 372, a new flap shape can be determined. For example, if the flap doesn't seal because it bends in one direction due to the aeroelastic effects. The flap shape might be adjusted in the opposite direction in its unloaded state, to mitigate this effect. Similarly, if the flap twists in one direction due to the aeroelastic effects and the twisting prevents sealing, the initial flap shape can be twisted in the opposite direction to mitigate this effect.

In one embodiment, besides adjusting the shape of the flap, the locations of the attachment points on the flaps can be adjusted. For example, the attachment locations can be moved farther or closer together. In yet another embodiment, the internal structure of the flap or the materials used in the flap may be changed, such as to make it more or less stiff in certain locations. The change in the internal structure can affect how much and where the flap deforms. Hence, the sealing performance may be improved. In a further embodiment, the shape, location and/or size of the seal may be adjusted to improve the sealing characteristics of the flap.

In 368, a determination of whether the shape of the flap meets manufacturing constraints can be determined. For example, it can be specified that the slope of the flap at the wing/flap interface be somewhat continuous, i.e., the slope of the wing at the trailing of the wing and the slope of the flap adjacent to the trailing edge of the wing may have be within some percent of one another, such as 5%. In another example, it can be specified, that the difference in height between the trailing edge of the wing and the flap adjacent to the trailing edge of the wing be within some specified margin. In yet another example, it can be specified, the flap doesn't push the seal down greater than some amount. In a further example, it can be specified that the loads at the attachment points to the wing be less than some maximum value. In a yet further example, it can be specified that the distance between the leading edge of the flap and the trailing edge flap remains above some minimum distance and below some maximum distance.

In 372, if the manufacturing constraints are not met, then the shape of the flap can be adjusted. For example, the shape of the flap can be adjusted so it deforms to a shape that better matches the slope of the trailing edge of the wing. As another example, it can be adjusted to lessen the loads at attachment points to the wings.

In 345, if the flap seals and the manufacturing constraints are met, than the aerodynamic performance of the wing and flap combination can be determined at the various flight conditions. This analysis can involve performing simulations of the wing and flaps at various conditions, such as take-off or at landing. Further, the simulations can be performed with the flap at various positions, such as extended down for landing.

The aerodynamic constraints can be somewhat independent of the sealing constraints. For example, the shape of flap can be adjusted so that the aerodynamic performance is better at a flight condition where it is not important that the flap is totally sealed. Thus, as long as the adjusted shape seals at a desired condition, such as cruise conditions, it may be possible to make tweaks to the flap that improve aerodynamic performance. For example, the leading edge of the flap might be made more round to improve aerodynamic performance.

In 374, if the flap seals, the manufacturing constraints are met and the aerodynamic constraints are met, then the as-built geometry for the flap can be fixed. Composite flaps are built in a jig. Thus, the jig shape can be specified. The jig shape is the unloaded shape that can be installed on an aircraft. Next, a few details of an aircraft that can include the flap designed in FIG. 6 are described with respect to FIGS. 7 and 8.

FIG. 6B is block diagram of a spoiler design methodology 402, according to one aspect of the present disclosure. In 402, the wing and flap designs from flap design method 350 in FIG. 6A can be received. The wing and flap design can include a specification of internal structure, materials and external shapes for the wing and flap including the flap locations. As described above, in one embodiment, one or more of the flaps can be pre-deformed on the ground so that the one or more flaps take on a more optimized aerodynamic shape in flight.

In 404, spoiler locations and sizes can be determined. Typically, the spoilers are going to be located forward of the flaps. The size can depend on the size of the wing and the size of the flaps. In this example, as described above, the spoilers can be around thirty inches in the chordwise direction and about eighty five inches in the spanwise direction. However, the sizes can vary from spoiler to spoiler. In addition, different airplane configurations with different sized wings and flaps can include different sized spoilers, smaller or larger. Thus, these examples are provided for the purposes of illustration only.

A portion of the spoilers can be coupled to at least one actuator. The actuator can allow the position of the spoiler to be adjusted independently of an adjacent flap. In particular, the actuator can be configured to rotate the spoiler upwards or downwards relative to a fixed portion of the wing. In some embodiments, a droop panel can be coupled to a flap via a mechanical linkage. Thus, the droop panel and the flap are configured to move as unit. In this instance, the droop panel's position can't be adjusted independently of the flap, such as to improve sealing between the flap and the droop panel.

The interfaces can include a number of attachment points of the spoiler to the fixed portion of the wing and their locations. In one embodiment, each spoiler can include four attachment points to a hinge line around which each spoiler can rotate. The number of attachment points can be more or less than four. Also, the number of attachment points can vary from spoiler to spoiler.

In 406, the spoiler shapes can be determined. As described above, in some embodiments, the spoiler can have a first portion and a second portion where the first portion includes a compliant trailing edge (CTE). The first portion can be attached to the second portion. In particular embodiments, the first portion including the CTE can be angled or curved downward and include a downward curved edge. This shape can help to improve sealing between the flap and the spoiler over a wider range of conditions. In particular, the shape of the first portion can be selected to increase sealing between a movable flap and the spoiler or the droop panel.

In 408, the spoiler internal structure and materials can be determined. The first portion can be attached to the second portion and can be formed from a more flexible material than the second portion. In one embodiment, the second portion can be formed from a metal, such as aluminum or a carbon composite. The materials used for the second portion can vary from spoiler to spoiler. For example, a portion of the spoilers can be formed from aluminum and a portion can be formed from a carbon composite.

In 410, flight conditions and airplane weight distributions can be determined. Some of these conditions can be received from flap design method 350 in FIG. 6A. In addition, the loading conditions including aerodynamic loads can also be received from flap design method 350. In 412, the wing, flap and spoiler shapes under loads can be determined.

In 414, for each spoiler, sealing conditions can be checked. For example, a determination can be made as to whether each spoiler seals against the flap for all positions of the flap in the TEVC system. Thus, the spoiler or the droop panel in the pre-deformed shape when brought to rest against the movable flap can make partial contact with the movable flap. At one or more flight conditions, the spoiler or the droop panel can deform under aerodynamic forces from the pre-deformed shape to a second shape such that in the second shape the spoiler or the droop panel has greater contact area with the movable flap or more fully contacts the movable flap to reduce air flow between the spoiler or the droop panel and the movable flap.

In 416, manufacturing constraints can be checked, such as whether it cost effective to manufacture the spoiler in the selected shape. In 418, aerodynamic constraints can be checked. Aerodynamic constraints can include a determination as to whether any gaps or steps between spoilers or spoilers and flaps are within acceptable tolerances.

When one or more of the sealing, manufacturing or aerodynamic constraints are not met, then in 420, one or more new spoiler shapes can be determined. The new spoiler shape can include adjusting an amount the CTE of the first portion of the spoiler is displaced downwards. When the first portion is curved downwards, this shape can be referred to as a downward pre-curl or downward curved.

In 422, when the sealing, aerodynamic and manufacturing constraints are met, the spoiler designs can be accepted and built. In 424, the plane can be assembled with the spoilers and then flown in 426. In 428, flight data can be received. The flight data can include pictures which show a position of the one or more spoilers in flight relative to one another.

In 430, based upon the flight data received in 428, the positions of one or more spoilers can be adjusted resulting in a new position of the spoiler. For example, the positions of one or more spoilers can be adjusted upwards or downwards. The adjustments can improve sealing between a flap and the spoiler. Further, the adjustments can reduce steps between adjacent spoilers, which can improve aerodynamic performance. These adjustments can vary depending on different flight conditions, such as altitude and velocity. For example, the position of the spoiler can be adjusted in response to changes in the position of one of the movable flaps. In some instance, the changes in position can increase the amount of contact between the spoiler and the movable flap, i.e., the spoiler (or the droop panel) can more fully contact the movable flap such that the contact area increases. A flight control system can be configured to automatically make these adjustments. In 432, the plane can be flown with these programmed adjustments.

FIG. 6C is block diagram of a method 450 of controlling an aircraft, according to one aspect of the present disclosure. In 452, a plane with wings, flaps and spoilers designed in accordance to the methods of FIGS. 6A and 6B can be received. Further, the plane can include a flight control system configured to control the spoiler positions to ensure proper sealing and minimize aerodynamic defects at a plurality of flight conditions. As described above, some of the spoiler positions can be selected based upon received flight data.

In 454, flight information and sensor input can be received while the airplane is in flight. The flight information can include altitude and velocity as well as pilot inputs. In 456, based upon the flight information, the flight control system can determine spoiler positions In 458, the flight control system can command the spoiler actuators to orientate the spoilers in the determined spoiler positions from 456. cur Examples of Aircraft Application An aircraft manufacturing and service method 500 shown in FIG. 7 and an aircraft 600 shown in FIG. 8 are now described to better illustrate various features of processes and systems presented herein. The fuselage cradle support assembly can be used in any stage of the aircraft lifetime, such as prototyping, manufacture, operations and maintenance. As was described above, a cradle support assembly design can be used for supporting other types of objects and is not limited to supporting only an airframe. For example, the cradle support assembly can be used to support a tank or a rocket section during manufacture.

During pre-production, aircraft manufacturing and service method 500 may include specification and design 504 of aircraft 600 and material procurement 506. The production phase involves component and subassembly manufacturing 508 and system integration 510 of aircraft 600. System integration can also occur before material procurement 506. Aspects of the specification and design of a spoiler system for aircraft 600 is described above with respect to FIGS. 1-6C. Thereafter, aircraft 600 may go through certification and delivery 512 in order to be placed in service 514. While in service by a customer, aircraft 600 is scheduled for routine maintenance and service 516 (which may also include modification, reconfiguration, refurbishment, and so on). While the embodiments described herein relate generally to servicing of commercial aircraft, they may be practiced at other stages of the aircraft manufacturing and service method 500.

Each of the processes of aircraft manufacturing and service method 500 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 8, aircraft 600 produced by illustrative aircraft manufacturing and service method 500 in FIG. 7 may include airframe 618 with a plurality of high-level systems 620 and interior 622. Examples of high-level systems 620 include one or more of propulsion system 624, electrical system 626, hydraulic system 628, and environmental system 630. Any number of other systems may be included. For example, the flap designs described above can be used as part of an aerodynamic control system, which is shown in FIG. 1.

Apparatus and methods shown or described herein may be employed during any one or more of the stages of the aircraft manufacturing and service method 500. For example, components or subassemblies corresponding to component and subassembly manufacturing 608 may be fabricated or manufactured in a manner similar to components or subassemblies produced while aircraft 600 is in service. Also, one or more aspects of the apparatus, method, or combination thereof may be utilized during steps 508 and 510, for example, by substantially expediting assembly of or reducing the cost of aircraft 600. Similarly, one or more aspects of the apparatus or method realizations, or a combination thereof, may be utilized, for example and without limitation, while aircraft 600 is in service, e.g., maintenance and service 516.

CONCLUSION

Different examples and aspects of the apparatus and methods are disclosed herein that include a variety of components, features, and functionality. In particular, apparatus and methods associated with a spoiler system on a wing used on an aircraft are discussed. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

What is claimed is:

1. An aerodynamic system for an aircraft, the aerodynamic system comprising:
    a fixed portion of a wing;
    a movable flap, coupled to the fixed portion of the wing; and
    a spoiler or a droop panel, coupled to the wing, having a pre-deformed shape, and comprising:
        a first portion, forming a trailing edge of the spoiler or the droop panel, and
        a second portion, configured to receive the first portion and attached to the fixed portion of the wing,
    wherein, while not in flight, the spoiler or the droop panel, being in the pre-deformed shape and when brought to rest against the movable flap, makes partial contact with the movable flap, and
    wherein, at one or more flight conditions, the spoiler or the droop panel deforms under aerodynamic forces from the pre-deformed shape to a second shape such that in the second shape the spoiler or the droop panel has greater contact area with the movable flap, than in the pre-deformed shape, to reduce air flow between the spoiler or the droop panel and the movable flap.

2. The aerodynamic system of claim 1, wherein the first portion has a downward curved edge.

3. The aerodynamic system of claim 1, wherein the one or more flight conditions include a cruise condition.

4. The aerodynamic system of claim 1, wherein the pre-deformed shape is bowed and straightens under the aerodynamic forces.

5. The aerodynamic system of claim 1, wherein the first portion is formed from a more flexible material than the second portion.

6. The aerodynamic system of claim 1, further comprising an actuator, coupled to the spoiler or the droop panel configured to rotate the spoiler or the droop panel upwards or downwards relative to the fixed portion of the wing.

7. The aerodynamic system of claim 6, further comprising a flight control system, configured to receive flight information characterizing the one or more flight conditions and, in response to the flight information, command the actuator to adjust a rotational position of the spoiler or the droop panel.

8. The aerodynamic system of claim 7, wherein the rotation position of the spoiler or the droop panel is adjusted downward to press the first portion against the movable flap causing the first portion to deform and to increase sealing between the movable flap and the spoiler or the droop panel.

9. The aerodynamic system of claim 1, further comprising a plurality of cruise conditions, wherein a shape of the first portion is selected to increase sealing between the movable flap and the spoiler or the droop panel at each of the plurality of cruise conditions.

10. The aerodynamic system of claim 9, wherein:
    a first position of the movable flap, relative to the fixed portion of the wing, changes at each of the plurality of cruise conditions, and
    a second position of the spoiler or the droop panel is adjusted in response to changes in the first position of the movable flap.

11. The aerodynamic system of claim 1, further comprising a mechanical linkage between the spoiler or the droop panel and movable flap which causes the movable flap and the spoiler or the droop panel to move together as a unit.

12. The aerodynamic system of claim 1,
    wherein the movable flap has a first pre-deformed shape, and
    wherein, at one or more flight conditions, the movable flap deforms under aerodynamic forces from the first pre-deformed shape to a third shape such that in the third shape the spoiler or the droop panel more fully contacts the movable flap, than in the first pre-deformed shape, to reduce the air flow between the spoiler or the droop panel and the movable flap.

13. The aerodynamic system of claim 1, wherein the spoiler or the droop panel is the spoiler, the spoiler being one of a plurality of spoilers, wherein:
    each of the plurality of spoilers is coupled to the wing,
    each of the plurality of spoilers has a pre-deformed spoiler shape different from each other,
    each of the plurality of spoilers comprises a corresponding first portion, forming a corresponding trailing edge, and a corresponding second portion, configured to receive the corresponding first portion and attached to the fixed portion of the wing;
    while not in flight, each of the plurality of spoilers, being in the pre-deformed spoiler shape and when brought to rest against the movable flap, makes partial contact with the movable flap, and
    at one or more flight conditions, each of the plurality of spoilers deforms under the aerodynamic forces from the pre-deformed spoiler shape to a second spoiler shape such that in the second spoiler shape each of the plurality of spoilers more fully contacts the movable flap, than in the pre-deformed spoiler shape, to reduce the air flow between the each of the plurality of spoilers and the movable flap.

14. The aerodynamic system of claim 13,
    wherein, when a first spoiler and a second spoiler, of the plurality of spoilers, rest against the movable flap, while not in flight, a step gap exists between a first corner of a first trailing edge of the first spoiler and a second corner of a second trailing edge of the second spoiler, and
    wherein, at one or more flight conditions, the first spoiler deforms under aerodynamic forces from a first pre-deformed shape to a third shape and the second spoiler deforms under aerodynamic forces from a second pre-deformed shape to a fourth shape such that the step gap is reduced.

15. The aerodynamic system of claim 13, further comprising:
    actuators, coupled to the plurality of spoilers, and
    a flight control system, coupled to the actuators,
        wherein each of the actuators is configured to rotate upwards or downwards a position of one of the plurality of spoilers relative to the fixed portion of the wing, and
        wherein the flight control system is configured to receive flight information characterizing the flight conditions and, in response to the flight information, to command each of the actuators to adjust the position of the one of the plurality of spoilers to:
            1) increase sealing between the movable flap and the one of the plurality of spoilers, and
            2) reduce step gaps between adjacent spoilers or combinations thereof.

16. The aerodynamic system of claim 1, further comprising a second movable flap and a second spoiler,
    each of the second movable flap and the second spoiler being coupled to the fixed portion of the wing,
    the second spoiler having a second pre-deformed shape, different from the pre-deformed shape, the second spoiler comprising:
- a third portion, forming the trailing edge of the second spoiler, and
- a fourth portion, configured to receive the third portion and attached to the fixed portion of the wing,
- wherein, while not in flight, the second spoiler being in the second pre-deformed shape and when brought to rest against the second movable flap, makes partial contact with the second movable flap, and
- wherein, at the one or more flight conditions, the second spoiler deforms under the aerodynamic forces from the second pre-deformed shape to a third shape such that in the third shape the second spoiler more fully contacts the second movable flap, than in the second pre-deformed shape, to reduce the air flow between the second spoiler and the second movable flap.

17. A method of operating an airplane comprising a wing, the method comprising:
- determining a shape of a fixed portion of the wing and a movable flap and determining a pre-deformed shape of a spoiler or a droop panel,
  - wherein the spoiler or the droop panel is mechanically coupled to and is rotatable relative to the wing, and
  - wherein the spoiler or the droop panel comprises
    - a first portion, forming a trailing edge of the spoiler or the droop panel, and
    - a second portion, configured to receive the first portion and attached to the fixed portion of the wing;
- determining
  - a first structure and first materials of the wing,
  - a second structure and second materials of the movable flap, and
  - a third structure and third materials of the spoiler or the droop panel; and
- specifying at least one of a plurality of different flight conditions;
  - wherein, while not in flight, the spoiler or the droop panel, being in the pre-deformed shape and when brought to rest against the movable flap, makes partial contact with the movable flap and
  - wherein, at the at least one of the plurality of flight conditions, the spoiler or the droop panel deforms, under aerodynamic forces, from the pre-deformed shape to a second shape such that in the second shape the spoiler or the droop panel more fully contacts the movable flap, than in the pre-deformed shape, to reduce air flow between the spoiler and the movable flap or between the droop panel and the movable flap; and
- flying the airplane with the spoiler or the droop panel in the pre-deformed shape.

18. The method of claim 17, further comprising:
specifying the plurality of different flight conditions;
determining at each of the different flight conditions, an amount of contact between the spoiler and the movable flap or between the droop panel and the movable flap;
determining whether the amount of contact between the spoiler and the movable flap or between the droop panel and the movable flap is acceptable and when the amount of contact is not acceptable; and
adjusting a first shape of the first portion increase the amount of contact.

19. The method of claim 17, further comprising:
receiving flight data, including a first shape of the spoiler or the droop panel at a plurality of different flight conditions, including the flight condition, and at least a first one of the plurality of different flight conditions;
determining a new position of the spoiler or the droop panel to increase an aerodynamic performance of the wing; and
configuring a flight control system to implement the new position of the spoiler or the droop panel at the first one of the flight conditions.

20. An aircraft comprising:
a fixed portion of a wing;
a plurality of movable flaps, coupled to the fixed portion of the wing; and
a spoiler, coupled to the wing, having a pre-deformed shape, and comprising:
- a first portion, forming a trailing edge of the spoiler, and
- a second portion, configured to receive the first portion and attached to the fixed portion of the wing,
  - wherein, while not in flight, the spoiler, being in the pre-deformed shape and when brought to rest against a first one of the plurality of movable flaps, makes partial contact with the first one of the plurality of movable flaps, and
  - wherein, at one or more flight conditions, the spoiler deforms under aerodynamic forces from the pre-deformed shape to a second shape such that, in the second shape, the spoiler more fully contacts the first one of the plurality of the movable flaps, than in the pre-deformed shape, to reduce air flow between the spoiler and the movable flap.

21. The aircraft of claim 20, further comprising a droop panel, coupled to the wing and mechanically coupled to the first one of the plurality of the movable flaps via a mechanical linkage, wherein:
the droop panel has a pre-deformed shape,
the droop panel comprises
- a first panel portion, forming a panel trailing edge of the droop panel, and
- a second portion, configured to receive the first panel portion and attached to the fixed portion of the wing,
  - wherein, while not in the flight, the droop panel, being in a pre-deformed panel shape and when brought to rest against the first one of the plurality of the movable flaps, makes partial contact with the first one of the plurality of movable flaps, and
  - wherein, at the one or more flight conditions, the droop panel deforms under the aerodynamic forces from the pre-deformed panel shape to a second panel shape such that, in the second panel shape, the droop panel more fully contacts the first one of the plurality of the movable flaps to reduce air flow between the droop panel and the movable flap.

22. The aircraft of claim 20, further comprising a plurality of spoilers, wherein:
the plurality of spoilers comprises the spoiler,
each of the plurality of spoilers is coupled to the wing,
each of the plurality of spoilers has a different pre-deformed shape,
each of the plurality of spoilers comprises
- a first spoiler portion, which forms a trailing spoiler edge, and
- a second portion, configured to receive the first spoiler portion and attached to the fixed portion of the wing;
  - while not in flight, each of the plurality of spoilers, being in the different pre-deformed shape and when brought to rest against the first one of the plurality of the movable flaps, makes partial contact with the first one of the movable flaps, and at the one or more flight conditions, each of the plurality of spoilers deforms under the aerodynamic forces from the different pre-deformed shape to a third shape such that in the third shape each of the plurality of spoilers more fully contacts the first one of the movable flaps to reduce air flow between each of the plurality of spoilers and the first one of the movable flaps.

23. An aerodynamic system for an aircraft, the aerodynamic system comprising:

a fixed portion of a wing;

a plurality of movable flaps, coupled to the fixed portion of the wing;

a plurality of spoilers, wherein:

each of the plurality of spoilers is coupled to the wing, each of the plurality of spoilers has a different pre-deformed shape while not in flight, each of the plurality of spoilers comprises a first portion, forming a trailing edge and a second portion, configured to receive the first portion and attached to the fixed portion of the wing;

wherein each of the plurality of spoilers is located at a different spanwise location on the wing and the different pre-deformed shape is selected to account for differences in aerodynamic forces at each of the different spanwise locations that occur during one or more flight conditions; and wherein, at the one or more flight conditions, each of the plurality of spoilers deforms under the aerodynamic forces from the different pre-deformed shape to a second shape such that in the second shape each of the plurality of spoilers more fully contacts a first one of the plurality of the movable flaps to reduce air flow between each of the plurality of spoilers and the first one of the plurality of the movable flaps.

24. The aerodynamic system of claim 23 further comprising one or more droop panels, wherein:

each of the one or more droop panels is coupled to the wing and one of the plurality of movable flaps via a mechanical linkage, each of the one or more droop panels has a different pre-deformed panel shape while not in the flight, each of the one or more droop panels comprises a first panel portion which forms a trailing panel edge and a second portion, configured to receive the first portion and attached to the fixed portion of the wing;

wherein each of the one or more droop panels is located at a respective different spanwise panel location on the wing and a different pre-deformed panel shape is selected to account for differences in aerodynamic forces at each of the different spanwise panel locations that occur during one or more flight conditions; and wherein, at the one or more flight conditions, each of the one or more droop panels deforms under the aerodynamic forces from the different pre-deformed panel shape to a second panel shape such that in the second panel shape each of the one or more droop panels more fully contacts a second one of the plurality of the movable flaps to reduce air flow between each of the one or more droop panel and the second one of the plurality of the movable flaps.

* * * * *